US012067809B2

(12) United States Patent
Braunstein et al.

(10) Patent No.: US 12,067,809 B2
(45) Date of Patent: Aug. 20, 2024

(54) MACHINE AND BATTERY SYSTEM PROGNOSTICS

(71) Applicant: CATERPILLAR INC., Peoria, IL (US)

(72) Inventors: Michael Dennis Braunstein, Washington, IL (US); Cameron Thomas Lane, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 346 days.

(21) Appl. No.: 17/554,730

(22) Filed: Dec. 17, 2021

(65) Prior Publication Data
US 2023/0196846 A1     Jun. 22, 2023

(51) Int. Cl.
*G07C 5/00*     (2006.01)
*B60L 58/12*     (2019.01)
(Continued)

(52) U.S. Cl.
CPC .............. *G07C 5/006* (2013.01); *B60L 58/12* (2019.02); *B60L 58/16* (2019.02);
(Continued)

(58) Field of Classification Search
CPC ...... B60L 58/12; B60L 58/16; B60L 2200/40; B60L 2240/622; B60L 2240/642;
(Continued)

(56) References Cited

U.S. PATENT DOCUMENTS 5,349,535 A     9/1994 Gupta
8,515,700 B2    8/2013 Oh et al.
(Continued)

FOREIGN PATENT DOCUMENTS

CN     103620907      3/2014
CN     109633470 B    4/2021
(Continued)

OTHER PUBLICATIONS

Energy consumption estimation integrated into the Electric Vehicle Routing Problem: R. Basso et al., Transportation Research Part D 69 (2019) 141-167 (Year: 2019).*
(Continued)

*Primary Examiner* — Peter D Nolan
*Assistant Examiner* — Tanya C Sienko

(57) ABSTRACT

A control system is programmed for monitoring the health and charge of batteries used to power a battery electric machine (BEM) or other heavy equipment and determining when maintenance, service, or replacement should be performed for the batteries as a function of data related to travel route segments over which the BEM or other heavy equipment is operated. The control system is programmed to receive historical information mapping the performance and energy consumption of a BEM or other heavy equipment, such as battery state-of-charge, power usage, battery state-of-health, and number of charge cycles for a battery supplying power to the BEM or other heavy equipment operating over a travel route segment, and instruct an operator to replace or perform maintenance on the batteries if the difference between present and historical performance exceeds a threshold level.

15 Claims, 5 Drawing Sheets

(51) Int. Cl.
*B60L 58/16* (2019.01)
*G01C 21/34* (2006.01)
*G01C 21/36* (2006.01)
*G07C 5/08* (2006.01)

(52) U.S. Cl.
CPC ....... *G01C 21/3469* (2013.01); *G07C 5/0808* (2013.01); *G07C 5/085* (2013.01); *G01C 21/3691* (2013.01)

(58) Field of Classification Search
CPC ........... B60L 2240/647; B60L 2260/52; B60L 2260/54; B60L 58/26; G01C 21/3469; G06Q 10/06; G06Q 10/20; G06Q 50/06; G06Q 10/04; G06Q 50/30; G08G 1/0112; G08G 1/0129; G08G 1/0133; Y02T 10/70
See application file for complete search history.

(56) References Cited

U.S. PATENT DOCUMENTS

| | | | |
|---|---|---|---|
| 10,197,631 B2* | 2/2019 | Barfield, Jr. | ....... G01R 31/3648 |
| 10,641,836 B1 | 5/2020 | Hou et al. | |
| 10,942,223 B1 | 3/2021 | Malloy et al. | |
| 11,814,032 B2* | 11/2023 | Poll | ..................... B60L 15/2045 |
| 2004/0122580 A1 | 6/2004 | Sorrells | |
| 2012/0296512 A1* | 11/2012 | Lee | ..................... H01M 10/486 701/29.3 |
| 2013/0079962 A1* | 3/2013 | Ishikawa | ............. B60L 15/2045 701/22 |
| 2013/0179062 A1* | 7/2013 | Yasushi | ................... G06F 17/00 701/123 |
| 2018/0222343 A1 | 8/2018 | Uchida | |
| 2019/0176639 A1* | 6/2019 | Kumar | .................. B60L 3/0046 |
| 2019/0202414 A1* | 7/2019 | Shih | ...................... B60L 53/665 |
| 2019/0275894 A1* | 9/2019 | Amacker | .............. H04L 9/3239 |
| 2019/0308510 A1 | 10/2019 | Beaurepaire et al. | |
| 2020/0393259 A1* | 12/2020 | Gantt, Jr. | ................ B60L 53/65 |

FOREIGN PATENT DOCUMENTS

JP 2009058518 A 3/2009
WO WO 2020/115761 A1 6/2020

OTHER PUBLICATIONS

Wikipedia entry for "Heavy equipment", downloaded from Wayback Machine (Dec. 4, 2021 scan) (Year: 2021).*
Written Opinion and International Search Report for Int'l. Patent Appln. No. PCT/US2022/080907, mailed Apr. 21, 2023 (9 pgs).

* cited by examiner

MACHINE AND BATTERY SYSTEM PROGNOSTICS

TECHNICAL FIELD

The present disclosure relates generally to a system and method for monitoring machine and battery health for a battery electric machine and, more particularly, to a system and method for monitoring battery health by comparing the performance of batteries supplying power to the battery electric machine over segments of a travel route for the machine.

BACKGROUND

Machines such as, for example, on and off-highway haul trucks, and other types of heavy equipment and machines are used to perform a variety of tasks. The various types of machines operating at any one time at a particular job site may include manned machines, semi-autonomous machines, and fully autonomous machines. These different types of machines are often operating along paths of travel that may have changing characteristics as a result of work being performed along segments of the travel routes, changes in weather, changes in temperature, changes in the maintenance and treatment of the road surfaces along the travel segments, and other variables. Hauling machines such as dump trucks and loading machines such as front end loaders travel along the different segments of their travel routes at a job site on their way to and from digging, loading, and processing sites (such as rock crushers) for the performance of various tasks at the job site. This traveling can include traversing one of many possible paths and different travel route segments at a job site. The paths traversed by the machines may include travel segments with unpredictable surface conditions caused by weather conditions, usage patterns, machine load losses, natural disasters, tectonic shifts, mud slides, rock slides, and/or other deteriorative events and/or processes. Routes traversed by these machines may have one or more segments that have changing or unpredictable conditions, which may include, for example, segments with ice, mud, sand, loose gravel, standing water, or other combinations of surface characteristics leading to soft underfoot conditions. Off-highway machines operating at job sites, such as oil sands mining sites, strip mines, and construction sites are often subject to soft underfoot conditions, including surfaces that are loose and viscous, forcing trucks and other machines to modify driving behavior on the fly.

The ability to make timely modifications to operating characteristics and driving behavior or to perform maintenance or repair to road surfaces for the off-highway machines operating under these conditions is largely dependent on predicting and identifying the presence of various types of roadway conditions such as soft underfoot conditions and potential slippage or other behavior of the different types of machines operating in the vicinity of each other. The unpredictability of the surface conditions along different travel segments may also make it difficult to predict energy requirements for upcoming segments. This may present a particular challenge for battery electric powered machines (BEMs) that will need enough energy stored in their batteries to finish assigned tasks that require the machine to traverse particular travel segments, and then return the machine to a charging station. A battery electric powered machine (BEM) will have a limited amount of space and weight carrying capacity available for storing on-board batteries. Monitoring the health of a battery system and knowing when to return the BEM to a location where the batteries can be charged, serviced, or replaced may present significant challenges, particularly at some of the very remote job sites where the machine may be operated.

A machine may traverse a portion of a job site, find that the surfaces in that portion include standing water or other conditions resulting in especially viscous or soft conditions, and be re-routed along another one of the possible paths or travel segments. Moreover, as multiple machines traverse the same paths and travel segments at a job site, soft underfoot conditions may worsen as ruts formed by each machine are repeatedly traversed by other machines. Re-routing machines at a job site may increase time and/or costs associated with traveling between two or more locations. The unpredictable portions with soft underfoot conditions may also disable the machine. For example, the machine may slip, get stuck, deplete its energy (e.g., fuel or electric charge), crash, or otherwise be disabled by the unpredictable portions.

One way to minimize the effect of unpredictable portions of roadways is to facilitate communications between machines and/or remote offices regarding the unpredictable portions. An example of facilitating communications between machines and/or remote offices is described in U.S. Patent Application Publication No. 2004/0122580 (the '580 publication) by Sorrells, published on Jun. 24, 2004. The '580 publication describes a control module, which determines if a machine is operating on a road having an adverse road condition. Adverse road conditions include soft underfoot conditions, steep grades, and potholes. Additionally, the '580 publication describes updating a site map stored in the control module or a remote office to show the adverse road condition. The '580 publication also describes using the control module or the remote office to notify an operator of the machine that the machine is approaching the adverse road condition. Additionally, the '580 publication describes using the control module or the remote office to dispatch a machine to the location of the adverse road condition for the purpose of correcting the adverse road condition.

However, the '580 publication does not provide a solution for actually predicting the energy usage of a machine such as an autonomously, nonautonomously, or semi-autonomously operated BEM as it travels along particular travel route segments, or for monitoring the health of the machine or its batteries.

The present disclosure is directed to overcoming one or more of the problems set forth above and/or other problems in the art.

SUMMARY

In one aspect, the present disclosure is directed to a control system programmed for monitoring the health and performance of batteries used to power a battery electric machine (BEM) and determining when maintenance, service, or replacement of the batteries should be performed as a function of data related to the travel route segments over which the BEM is operated. The control system may be programmed to determine the travel route segment where the BEM is operating, determine a terrain on which the BEM is operating, and generate signals indicative of data representing present performance information for the BEM including one or more of the present battery state-of-charge, battery state-of-health, and number of charge cycles for each of the batteries used to power the BEM, present physical and operational characteristics for the BEM, and present physical characteristics of each of the travel route segments over which the BEM is operating at a job site, using a sensing system. The system may also be programmed to receive historical information mapping the performance and energy consumption of one or more BEMs operating over one or more travel route segments of the job site. The historical performance information may include one or more of battery state-of-charge, power usage, battery state-of-health, and number of charge cycles for the one or more batteries supplying power to the one or more BEMs with associated physical and operational characteristics as the one or more BEMs were operated over one or more travel route segments. The system may be still further programmed to compare the historical performance and energy consumption information for a same or similar BEM traveling on a same or similar travel route segment to the present performance and energy requirements while compensating for energy consumption contributing factors that are not common to both the historical performance and the present performance, and instruct an operator or autonomous control system to replace or perform maintenance on the batteries if the difference between present and historical performance exceeds a threshold level.

In another aspect, the present disclosure is directed to a method of monitoring the health or performance of batteries used to power a battery electric machine (BEM) and determining when maintenance, service, or replacement of the batteries should be performed as a function of data related to the travel route segments over which the BEM is operated. The method may include determining a travel route segment where the BEM is located, determining a terrain on which the BEM is operating, and generating signals indicative of data representing present performance information for the BEM including one or more of the present battery state-of-charge, battery state-of-health, and number of charge cycles for each of the batteries used to power the BEM, present physical and operational characteristics for the BEM, and present physical characteristics of each of the travel route segments over which the BEM is operating at a job site, using a sensing system. The method may also include receiving historical information mapping the performance and energy consumption of the BEM operating over one or more travel route segments to the one or more travel route segments. The historical performance information may include one or more of battery state-of-charge, power usage, battery state-of-health, and number of charge cycles for the one or more batteries supplying power to the BEM with associated physical and operational characteristics as it was operated over one or more travel route segments having particular physical characteristics same or similar to physical characteristics of present travel route segments over which the BEM is currently being operated. The method may still further include comparing the historical performance and energy consumption information for a same or similar BEM traveling on a same or similar travel route segment to the present performance and energy requirements while compensating for energy consumption contributing factors that are not common to both the historical performance and the present performance, and instruct an operator or autonomous control system to replace or perform maintenance on the batteries if the difference between present and historical performance exceeds a threshold level.

In another aspect, the present disclosure is directed to a computer-readable medium for use in managing the health or performance of batteries used to power a battery electric machine (BEM), the computer-readable medium including computer-executable instructions for performing a method that may include monitoring the health or performance of batteries used to power a battery electric machine (BEM) and determining when maintenance, service, or replacement of the batteries should be performed as a function of data related to the travel route segments over which the BEM is operated. The method may include determining a travel route segment where the BEM is located, determining a terrain on which the BEM is operating, and generating signals indicative of data representing present performance information for the BEM including one or more of the present battery state-of-charge, battery state-of-health, and number of charge cycles for each of the batteries used to power the BEM, present physical and operational characteristics for the BEM, and present physical characteristics of each of the travel route segments over which the BEM is operating at a job site, using a sensing system. The method may also include receiving historical information mapping the performance and energy consumption of the BEM operating over one or more travel route segments to the one or more travel route segments. The historical performance information may include one or more of battery state-of-charge, battery state-of-health, and number of charge cycles for the one or more batteries supplying power to the BEM with associated physical and operational characteristics as it was operated over one or more travel route segments having particular physical characteristics same or similar to physical characteristics of present travel route segments over which the BEM is currently being operated. The method may still further include comparing the historical performance and energy consumption information for a same or similar BEM traveling on a same or similar travel route segment to the present performance and energy requirements while compensating for energy consumption contributing factors that are not common to both the historical performance and the present performance, and instruct an operator or autonomous control system to replace or perform maintenance on the batteries if the difference between present and historical performance exceeds a threshold level.

DETAILED DESCRIPTION

Figure 1:
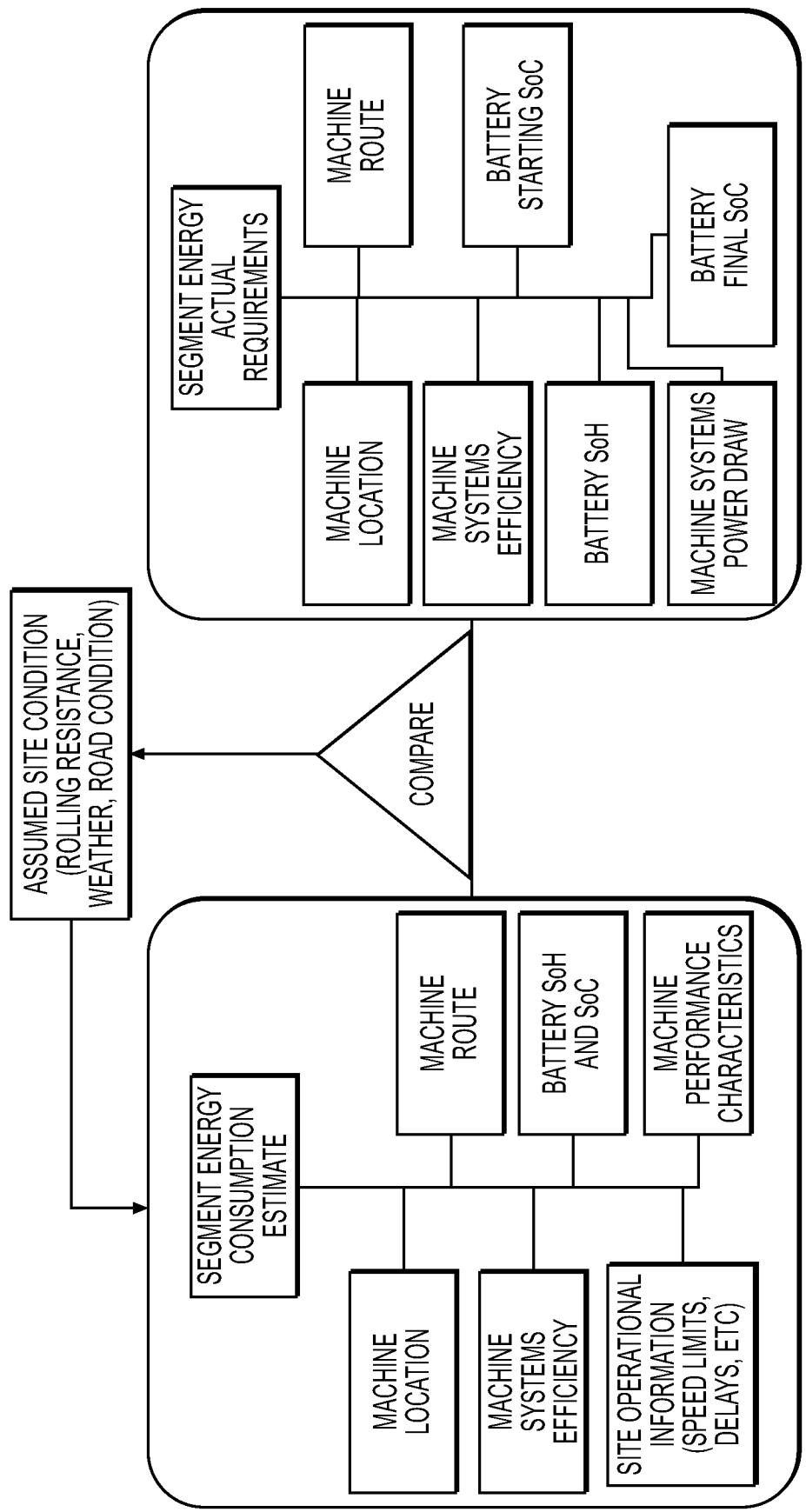
FIG. 1 is a schematic illustration of a method according to an exemplary embodiment of this disclosure for estimating and then measuring the energy consumption of a machine traveling over a travel route segment and utilizing a feedback loop to improve assumptions made in the estimation.

FIG. 1 is a flowchart illustrating an exemplary implementation of a system and method according to this disclosure for estimating and then measuring energy consumption of a machine, and in particular the energy consumption of battery electric powered heavy equipment used on a work site for performing various operations such as earth moving, mining, road construction, etc., and comparing the results of the estimation and the actual measurements in order to improve subsequent estimations of energy consumption.

Figure 2:
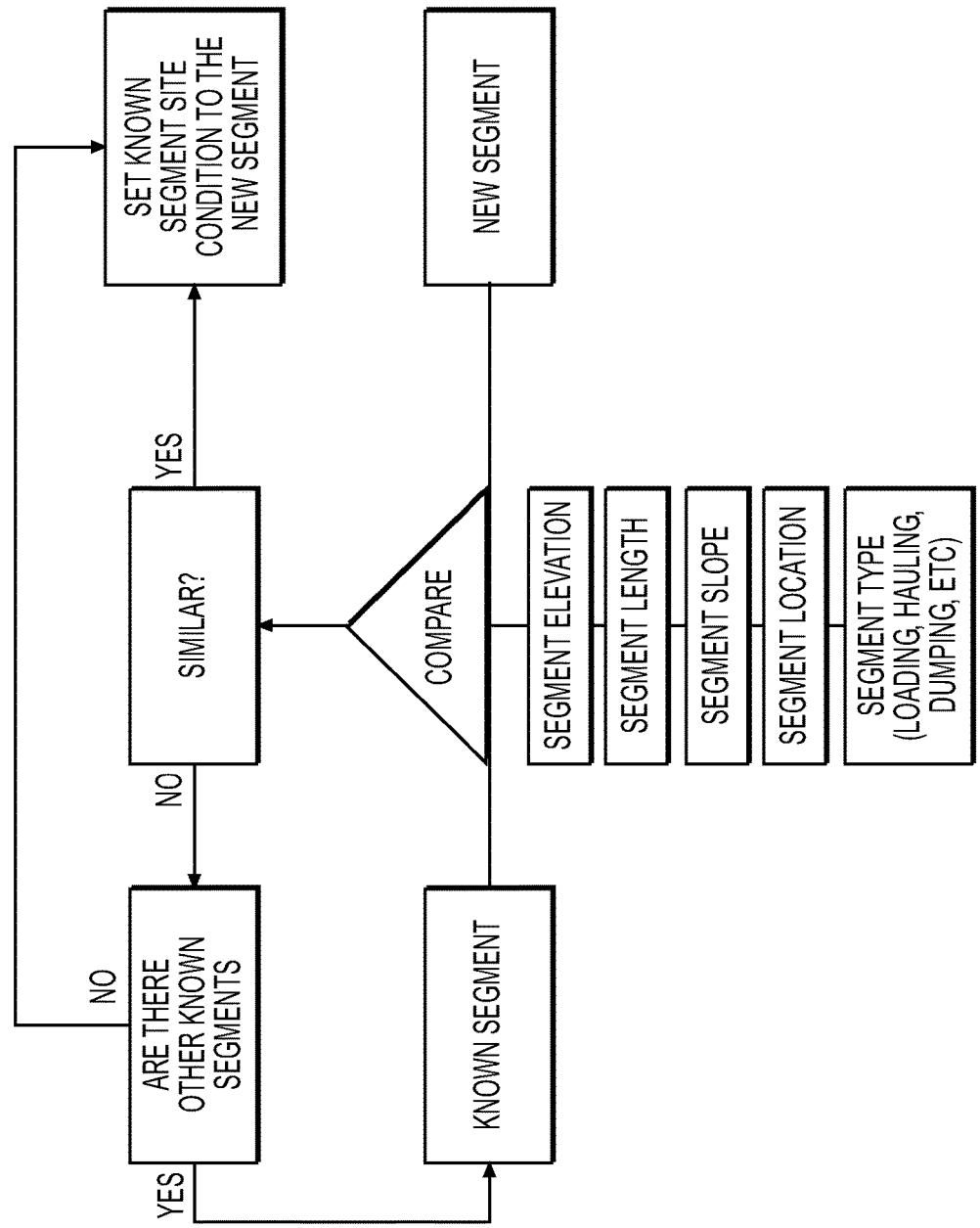
FIG. 2 is a schematic illustration of a method according to an embodiment of this disclosure for improving estimated energy consumption for each new travel route segment based on known same or similar travel route segments.

FIG. 2 is a flowchart illustrating a method for improving estimations of energy consumption by a machine traveling over a new travel route segment based on a known travel route segment with same or similar physical characteristics. Throughout this application, reference to "same or similar" physical characteristics, "same or similar" machine, "same or similar" BEM, and "same or similar" travel route segments, encompasses physical characteristics, machines, BEMs, and travel route segments that are the same or identical in physical or operational characteristics, and within standard industry tolerances that would be understood by one of ordinary skill in the art.

Figure 3:
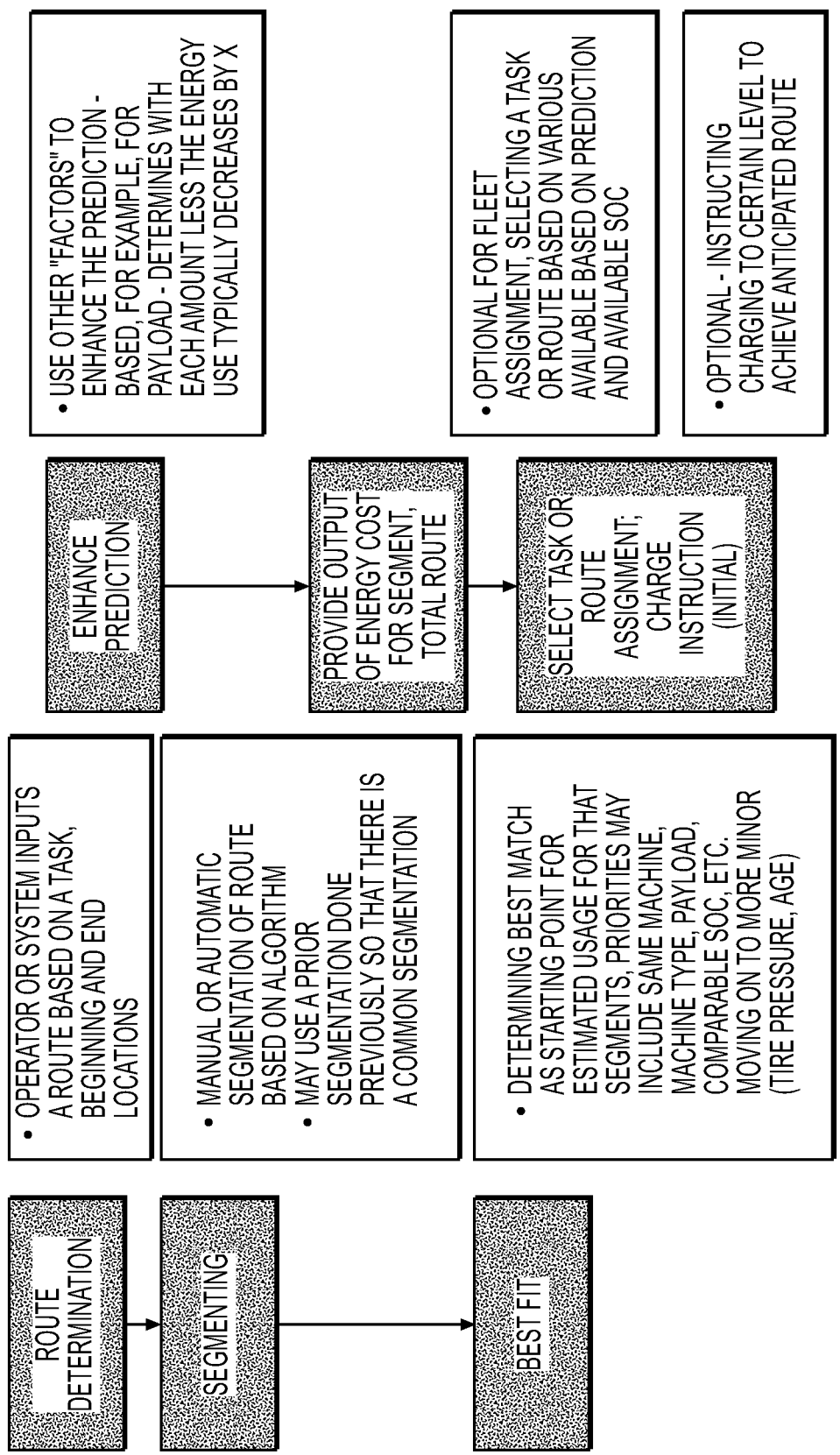
FIGS. 3-5 illustrate additional exemplary processes for segmenting a travel route for a machine, collecting historical data indicative of the health and performance of batteries powering the machine along predetermined travel route segments, comparing present health and performance of batteries powering same or similar machines traversing same or similar travel route segments, and providing fault alarms when comparison reveals results outside of threshold values.
Figure 4:
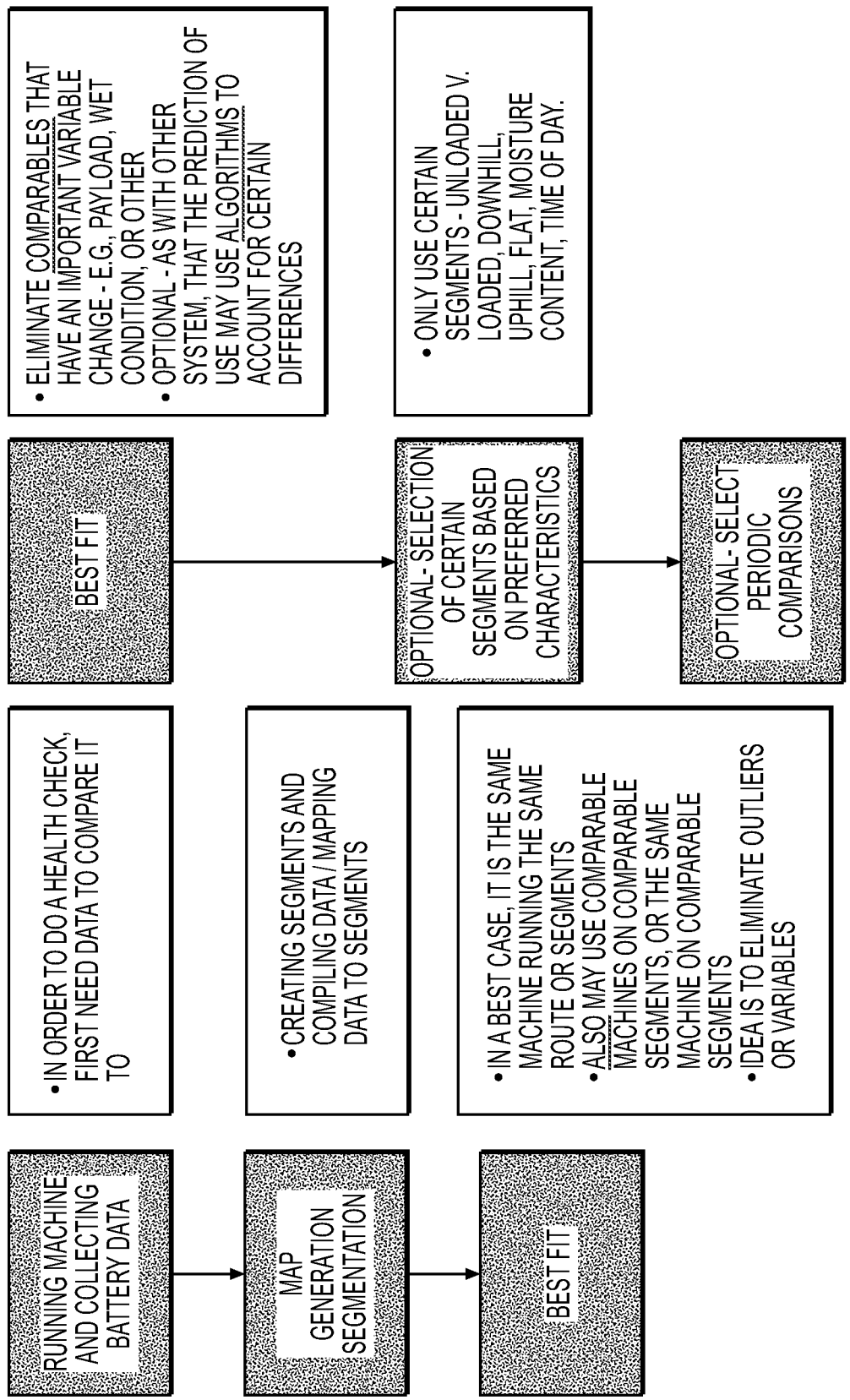
Figure 5:
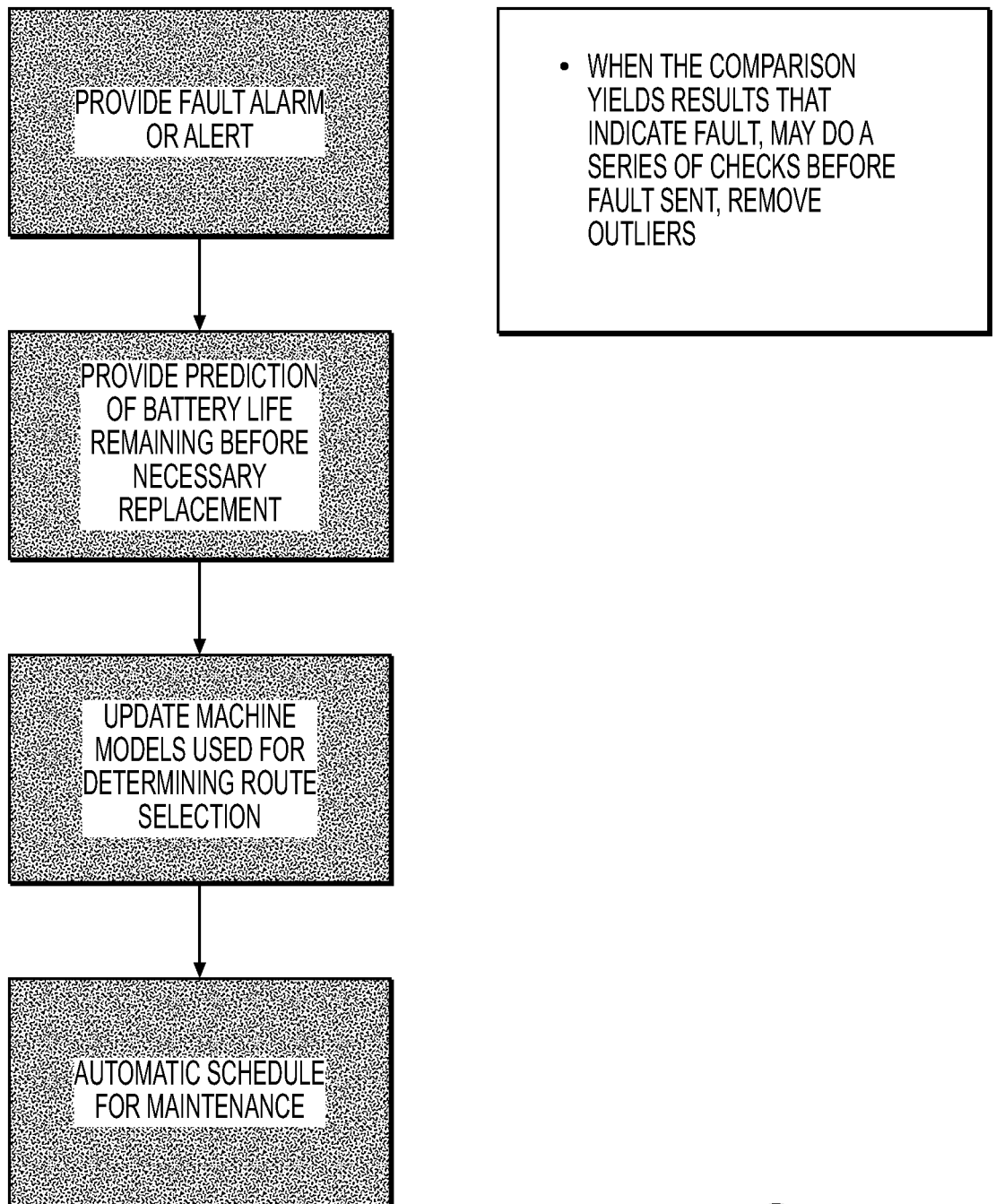

FIGS. 3-5 illustrate some exemplary processes according to embodiments of this disclosure that may include identifying particular travel route segments over which a machine may be operated in order to perform certain tasks, receiving data indicative of the historical health, performance, and energy usage of a machine with particular physical and operational characteristics, and the batteries powering the machine over a particular travel route segment, comparing the historical data with present data indicative of machine and battery health, performance, and energy usage for a same or similar machine traversing same or similar travel route segments, and using the results of the comparison to estimate energy usage for new travel route segments and assess battery health and performance.

The devices, systems, and methods according to various embodiments of this disclosure may be configured to monitor the energy consumption of a machine using a feedback loop as shown in FIG. 1 to improve assumptions and estimations of energy usage of a particular machine traveling over a particular segment of a travel route, and monitor machine and battery health. The improved estimations of energy usage may enable enhanced management of an individual battery electric machine (BEM), a fleet of BEMs, and overall energy usage at a work site where the BEMs are operating. Various exemplary embodiments may include one or more controllers configured (programmed) to estimate the energy that will be required for a particular machine traveling and performing specific tasks over a predetermined travel route segment, including making assumptions of factors indicative of or contributory to the energy consumption such as the particular travel route segment being traversed by the machine, the machine system efficiencies for that machine, site operational information such as speed limits, delays, and safety requirements, physical characteristics of the route, such as soft underfoot conditions, type of surface, granularity of the surface, wetness or dryness of the surface, topography, the battery state-of-health (SOH), state-of-charge (SOC), and number of charge cycles for the battery or batteries powering the machine, and other machine and/or power supply performance characteristics. The assumptions made by the one or more controllers may be based on real time measured or observed characteristics, data retrieved from one or more databases stored in memory onboard the machine, and/or historical or empirical information provided by a central command or back office servers. The exemplary embodiments may also include the one or more controllers being configured to measure the actual factors indicative of energy consumption of the machine along the different travel route segments for the machine, including measuring all of the factors that were assumed and/or estimated, and then updating the assumptions and estimations of the energy consumption based on the actual measured factors, in some cases using machine learning, virtual modelling, and other artificial intelligence techniques.

The battery state-of-health (SOH) is a "measurement" that reflects the general condition of a battery and its ability to deliver a specified performance compared with a fresh battery. SOH takes into account such factors as charge acceptance, internal resistance, voltage and self-discharge. It is a measure of the long term capability of the battery and gives an "indication," not an absolute measurement, of how much of the available "lifetime energy throughput" of the battery has been consumed, and how much is left.

The state-of-charge (SOC) of a battery represents the short term capability of the battery. During the lifetime of a battery, its performance or "health" tends to deteriorate gradually due to irreversible physical and chemical changes which take place with usage and with age until eventually the battery is no longer usable or dead. The SOH is an indication of the point which has been reached in the life cycle of the battery and a measure of its condition relative to a fresh battery. Unlike the SOC which can be determined by measuring the actual charge in the battery, there is no absolute definition of the SOH. It is a subjective measure in that different people derive it from a variety of different measurable battery performance parameters which they interpret according to their own set of rules. It is an estimation rather than a measurement, but preferably an estimation based on a consistent set of rules using comparable test equipment and methods. Battery manufacturers do not specify the SOH because they only supply new batteries. The SOH only applies to batteries after they have started their aging process either on the shelf or once they have entered service. The SOH definitions are therefore specified by test equipment manufacturers or by the user.

The SOH of a battery may be used to provide an indication of the performance which can be expected from the battery in its current condition or to provide an indication of how much of the useful lifetime of the battery has been consumed and how much remains before it must be replaced. In critical applications, such as on BEMs operating in remote locations where access to repair or servicing facilities is limited, the SOC gives an indication of whether a battery will be able to support the load and achieve a desired range when called upon to do so. Knowledge of the SOH will also help to anticipate problems to make fault diagnosis or to plan replacement or servicing. This is essentially a monitoring function tracking the long term changes in the battery.

Any parameter which changes significantly with age, such as cell impedance or conductance, can be used as a basis for providing an indication of the SOH of the cell. Changes to these parameters will normally signify that other changes have occurred which may be of more importance to the user. These could be changes to the external battery performance such as the loss of rated capacity or increased temperature rise during operation or internal changes such as corrosion. Because the SOH indication is relative to the condition of a new battery, the measurement system should retain a record of the initial conditions or at least a set of standard conditions. Thus if cell impedance is the parameter being monitored, the system must keep in memory as a reference, a record of the initial impedance of a fresh cell. If counting the charge/discharge cycles of the battery is used as a measure of the battery usage, the expected battery cycle life of a new cell would be used as the reference. In a Lithium ion battery, since the cell capacity deteriorates fairly linearly with age or cycle life, the expired, or remaining cycle life, depending on the definition used, is often used as a crude measure of the SOH. Impedance or the cell conductance may also be used. In pursuit of accuracy, several cell parameters may be measured, all of which vary with the age of the battery, and an estimation of the SOH may be derived from a combination of these factors. Examples are capacity, internal resistance, self-discharge, charge acceptance, discharge capabilities, the mobility of electrolyte, and cycle counting if possible. The absolute readings will depend on the cell chemistry involved. Weighting may be added to individual factors based on experience, the cell chemistry and the importance the particular parameter in the application for which the battery is used. If any of these variables provide marginal readings, the end result will be affected. A battery may have a good capacity but the internal resistance is high. In this case, the SOH estimation will be lowered accordingly. Same or similar demerit points may be added if the battery has high self-discharge or exhibits other chemical deficiencies. The points scored for the cell are compared with the points assigned to a new cell to give a percentage result or figure of merit. Such complex measurements and processing may be performed by one or more processors of controllers used in performing various methods according to embodiments of this disclosure. Some embodiments may also employ machine learning or other artificial intelligence techniques to derive more useful indications of SOH for a battery.

An alternative method of specifying the SOH is to base the estimation on the usage history of the battery rather than on some measured parameter. The number of charge-discharge cycles completed by the battery is an obvious measure, but this does not necessarily take into account any extreme operating conditions experienced by the battery which may have affected its functionality. It is however possible to record the duration of any periods during which the battery has been subject to abuse from out of tolerance voltages, currents or temperatures as well as the magnitude of the deviations. From this data a figure of merit representing the SOH can be determined by using a weighted average of the measured parameters. Battery usage data can be stored in memory and downloaded when required.

The devices and systems for managing the energy consumption of the machine may include power management logic that can calculate an estimated energy requirement for the machine batteries based on information provided from the external environment of the machine, the operational status of the machine, the rolling resistance encountered by the machine over a particular segment of the travel path, one or more command inputs from an operator, and one or more operational parameters of the machine. The information provided to the power management logic may come from data inputs (e.g., sensors, telemetries, etc.), memory, user commands, or it may be derived through the use of empirical formulas and physical principles. The power management logic may comprise software, hardware, or any combination of software or hardware. In some variations, the devices and systems may include one or more processors (e.g., a microprocessor) that can perform the power management logic, and use machine learning and other artificial intelligence techniques to develop and improve virtual models that may be used in predicting the energy consumption for a particular machine traveling over a particular travel route segment, and/or the energy consumption for one or more machines, or even an entire fleet of machines traveling over many different travel route segments. The predicted energy consumption that is determined by the power management logic may be used to command control of a machine, and implement changes, such as changes to the route that will be taken by one or more machines, changes to the tasks that will be performed by the one or more machines, changes to the operational parameters for the one or more machines, and changes to road repair and maintenance for the one or more routes or travel route segments that will be traversed by the one or more machines in the performance of its/their tasks.

Power management logic may be used in conjunction with an electric motor control mechanism to control the amount of electric power consumed by the motor as the machine travels along a particular travel route segment. The consumed power may be expressed as an optimized speed or speeds to which the machine is controlled, alone or in combination with the types of tasks that may be performed by the machine along the segment. For example, the electric motor control mechanism may adjust the speed of the machine and/or other operational parameters to an optimized speed or other optimized operational parameters as the machine travels over a particular travel route segment, or may control performance of various tasks to be performed by the machine, such as earth moving tasks, including digging, grading, bull dozing, hauling, etc. In some circumstances, the unpredictability of the rolling resistance that will be encountered by the machine when traveling over a particular travel route segment, as a result of changes in the weather or road surface conditions, for example, may result in frequent real time updates to the actual energy consumption for particular travel route segments as compared with predicted energy consumption over those segments, and the use of machine learning in the power management logic may enable continual improvements in predictive models of energy consumption for the machine.

The systems and methods according to various embodiments of this disclosure may be used in predicting the energy requirements for a particular battery electric powered machine (BEM) to traverse a particular segment of a travel route at a work site and complete its desired tasks, or the energy requirements for more than one machine, such as a plurality of BEMs in a fleet of heavy equipment being operated at one or more work sites. Large BEMs, such as heavy machinery or equipment used to perform various mining and other earth moving tasks, may have limited range as a result of the relatively high amount of energy required to power such machines in conjunction with limited amounts of space and weight capacity on the machinery for storing batteries that provide the energy. Therefore, predicting the energy requirements for upcoming travel route segments over which a machine will be operated and over which it will perform various tasks is important for determining whether the machine will be able to complete certain tasks with the available amounts of energy, and then return to a battery exchange or charging station. The systems and methods according to various embodiments of this disclosure may also be used with hybrid machines that are powered by a combination of batteries and other energy sources such as internal combustion engines or fuel cells.

In some embodiments, a prediction of energy requirements for upcoming travel route segments may apply to more than one machine, and machine learning or other artificial intelligence techniques may be employed for managing the most efficient and effective distribution of travel and task assignments amongst the plurality of machines. A system and method for estimating and predicting the energy requirements for a BEM that will be operated over predetermined travel route segments may include estimating and predicting various factors indicative of or contributory to the energy consumption such as the location of the machine, the machine system efficiencies for that machine, site operational information such as speed limits, delays, and safety requirements, characteristics of the route, such as soft underfoot conditions, type of surface, granularity of the surface, wetness or dryness of the surface, topography, the battery state-of-health (SOH), state-of-charge (SOC), and number of charge cycles for the battery or batteries powering the machine, cooling system efficiency, and other machine performance characteristics. The assumptions made by one or more controllers operating power management logic may be based on real time measured or observed characteristics, data retrieved from one or more databases stored in memory onboard the machine, and/or information provided by a central command or back office servers. The exemplary embodiments may also include the one or more controllers being configured (programmed) to measure the actual factors indicative of energy consumption of the machine along the different travel route segments for the machine, including measuring all of the factors that were assumed and/or estimated, and then updating the assumptions and estimations of the energy consumption based on the actual measured factors, in some cases using machine learning, virtual modelling, and other techniques.

A system including one or more controllers programmed with the power management logic and configured to perform the methods according to various embodiments of this disclosure for managing the energy consumption of a battery electric powered (BEM) machine, a machine with a hybrid power system including one or more batteries, or a machine with another source of power such as a hydrogen fuel cell may be manually engaged by an operator either when the machine is turned on, or in the midst of a work operation. In various exemplary implementations, an operator or an autonomous or semi-autonomous control system may set a preferred speed, and a range at which to manage that speed over at least a portion of a planned trip along predetermined travel route segments, one or more drive train gear ratios, amounts of braking, including dynamic braking during which energy may be generated and stored onboard the machine, tasks to be performed, and/or other operational parameters. The system and method may include determining an optimal (e.g., most efficient utilization of battery charge) speed, gear ratio, braking, and tasks to be performed within the range selected. By calculating and then averaging the most efficient operational parameters over a given route, estimating and then measuring actual energy consumption, and then employing a feedback loop to improve various assumptions made during the estimation process, the system can optimize energy usage within the machine's stated speed, desired tasks, and range, and adapt and change planned travel routes, tasks to be performed by the machine, or even issue commands for maintaining or repairing road surfaces over particular travel route segments when it is determined that the rolling resistance being encountered by the machine exceeds expected threshold amounts of rolling resistance. Rolling resistance encountered by a machine traveling over a particular travel route segment may be estimated in real time based on the measured actual amounts of energy being consumed, and comparison of those measured actual amounts of energy to historical amounts of energy consumed by a same or similar machine traveling over a same or similar travel route segment. The power management logic may determine energy efficiency for a particular BEM over the course of one or more travel route segments. The destination or exact travel path of the machine does not have to be known ahead of time (e.g., input into a GPS or other same or similar system by an operator). The system (e.g., anticipated destination logic) may infer the destination for a particular work site based on a subset of the information inputs to the system, such as the time of day, current location, work assignments, and other inputs. In some variations, an operator or autonomous or semi-autonomous controller can accelerate or decelerate (e.g., override the system) for emergency situations such as passing, braking and the like, depending on other machines or obstacles encountered at a work site. In some variations, the systems and methods according to various embodiments of this disclosure may provide suggested speeds, accelerations, manners in which particular tasks are performed, etc., to an operator or autonomous or semi-autonomous controller in order to better optimize power usage.

In some variations, the system may be onboard the machine and completely independent from any exterior sources of information (other than onboard sensors), or, alternatively, automatically enabled via instructions received over a wireless communication system from a back office or other central server, or from one or more servers on the cloud. In some implementations, an operator or autonomous or semi-autonomous control system for the machine may set a destination, target speed, accelerations, range, tasks to be performed, or other variables. By automatically monitoring the machine's real-time speed, braking and acceleration, and other data received from various sensors onboard the machine and/or from one or more databases, the power management logic implemented by a control system according to various embodiments of this disclosure may predict energy usage based on comparisons of historical and real time data for same or similar machines operating along same or similar travel route segments and determine the most efficient speed, acceleration, braking, and other operational parameters for completing desired tasks along various travel route segments.

In some variations, the operator or autonomous control system may provide a destination and list of tasks to be performed, and the control logic, including machine learning algorithms and virtual energy consumption models created and implemented by the power management logic of the control system, may determine the optimal speeds, gear ratios, and other operational parameters for the machine while it is operating along one or more travel route segments. The system may use safety parameters in place at a particular job site, such as speed limits and allowable proximity to other machines, current weather and road surface conditions, the presence of soft underfoot conditions, type of surface, granularity of the surface, wetness or dryness of the surface, topography, the battery state-of-health (SOH), state-of-charge (SOC), and number of charge cycles for the battery or batteries powering the machine, and other machine performance characteristics, physical calculations, and statistical models from previous trips along the same or same or similar travel route segments to select the optimal operational parameters for the machine.

One or more controllers onboard a machine for managing the energy consumption of the machine may be programmed with power management logic operable to calculate predicted energy requirements for the one or more batteries of a machine, such as the various types of heavy equipment operated at a mine or other work site, from information about the external environment of the machine, information about the operational status of the machine, one or more command inputs, and one or more operational parameters of the machine. The one or more controllers may include processors implementing the power management logic, and various machine system control mechanisms, wherein the machine system control mechanisms control the application of power provided by the one or more batteries onboard the machine to the various traction control and other output mechanisms of the machine or heavy equipment.

The power management logic may determine energy requirements imposed upon the one or more machine batteries or other power sources based on information characterizing the machine, operation of the machine, and the environment of the machine, which may include the current location of the machine, the elevation of the machine, upcoming elevations of the machine, the current slope/grade of the route, the predicted slope/grade of the next segments (or upcoming segments) of the route, tasks to be performed by the machine (such as bulldozing, grading, load hauling . . . ), speed limit information of the current route segment, speed limit information of upcoming route segments, the surface conditions of the known or predicted route (or a portion thereof), proximity and predicted travel paths for other machines and equipment in the vicinity of the machine, the location of the various travel route segments at a particular job site, the weather around the machine, present wind direction, the predicted wind direction for upcoming route segments, present wind velocity, the predicted wind velocity for upcoming route segments, current temperature, the predicted temperature for upcoming route segments, current air pressure, predicted air pressure for upcoming route segments, time of day, date, day of week, visibility, present road surface conditions, predicted road surface conditions for upcoming travel route segments, and the distance to/from other machines operating at the job site. Any of this information may be acquired by measuring (e.g., from sensors), or it may be detected or input (e.g., from manual inputs, telemetry, detectors, a memory, etc.), or it may be derived (e.g., based on other information, including other environmental information).

The power management logic may determine energy requirements for the machine batteries based on information about the operational status of the machine. The operational status information input may include the machine's current speed, the machine's current orientation, the wheel rotations per minute, the battery state-of-charge, battery state-of-health, number of battery charge cycles, the voltage of the battery, the amp hours from the battery, the temperature of the battery, the age of the battery, tire pressures, the drag force due to rolling resistance of the machine, the weight of machine (including payload of the machine), the efficiency of the cooling system of the machine, and other operational parameters. Any of this information may be acquired by measuring (e.g., by sensors), or it may be input (e.g., from an external telemetry, a memory, etc.), or it may be derived (e.g., based on other information, including other operational status information).

A control system utilizing power management logic according to various implementations of this disclosure may be programmed for monitoring the health and charge of batteries used to power a battery electric machine (BEM), issuing an alarm or alert when historical energy usage for a particular BEM traversing a particular travel route segment differs from data indicative of present energy usage for a same or similar machine traversing a same or similar travel route segment by more than a threshold value, and determining or predicting the maintenance or replacement requirements or schedule for the batteries as a function of the travel route segments over which the BEM is operated. The control system may be programmed to determine the BEM location, determine a terrain on which the BEM is operating, estimate soil conditions, such as a terrain surface coefficient of friction, and provide output signals indicative of data representing present performance information for the BEM including one or more of the present battery state-of-charge, battery state-of-health, and number of charge cycles for each of the batteries used to power the BEM, BEM speed, pose, size, weight, tire type, load, cooling system performance, and gear ratio, and weather characteristics and road conditions and characteristics for each of the travel route segments over which the BEM is operating at a job site, using a sensing system. The system may also be programmed to receive historical information mapping the performance and energy consumption of one or more BEMs operating over one or more travel route segments of the job site. The historical performance information may include one or more of battery state-of-charge, power usage, battery state-of-health, and number of charge cycles for the one or more batteries supplying power to the one or more BEMs with associated physical and operational characteristics as the one or more BEMs were operated over one or more travel route segments. The system may be still further programmed to compare the historical performance and energy consumption information for a same or similar BEM traveling on a same or similar travel route segment to the present performance and energy requirements while compensating for energy consumption contributing factors that are not common to both the historical performance and the present performance, and provide a fault warning or other indicator that the battery requires service or replacement, or that there may be some other error associated with the power system. The system may be programmed to automatically schedule a machine for service or assign a route to the machine for service, and/or instruct an operator or autonomous control system to replace or perform maintenance on the batteries if the difference between present and historical performance exceeds a threshold level.

The power management logic may also determine energy requirements for the machine batteries based on command input information. Command input information may include the acceleration applied by an operator or autonomous or semi-autonomous control system, braking, the intended destination, preferred speed, maximum and minimum range over which speed should adjust, and preferred route. Any of this information may be acquired by input (e.g., from an external telemetry, keyboard, mouse, voice command, a memory, etc.), sensor (e.g., optical detectors, etc.), or it may be derived (e.g., based on other information, including other command information).

The power management logic may also determine energy requirements for the machine batteries based on information about one or more operational parameters of the machine. Operational parameters may include aerodynamic parameters, rolling resistance parameters, drive train efficiency parameters, electric motor efficiency parameters, and battery model parameters, battery charge and discharge relationships, type of battery, and other factors. Any of this information may be input (e.g., from an external telemetry, a memory, etc.), or it may be derived (e.g., based on other information, including historical information or other operational parameter information).

The power management device or system according to various embodiments of this disclosure may still further include a memory containing machine information about one or more operational parameters for one or more machines. The memory may store any of the information about the operating characteristics and parameters for each type, make, and model of machine or equipment, age and condition of each individual machine and its various operating systems and components, operational status of the one or more batteries on each machine, including state-of-charge, battery state-of-health, and charge cycles for each battery, with the information including derived or historical information.

The devices and systems described herein may be used with any appropriate machine, including battery electric-powered machines (BEM), hybrid internal combustion engine/electric battery powered machines, electric machines powered by the electric grid (plug-in), electric machines powered by the sun (solar), and hydrogen fuel cell machines.

Systems for managing the energy consumption of a machine, BEM, or other heavy equipment, according to exemplary embodiments of this disclosure, may include a first input, operable to receive information about the environment where the machine is operating, a second input, operable to receive information about operational parameters of the machine, a third input, operable to receive one or more command inputs from an operator or autonomous control system of the machine, a memory containing information about one or more operational parameters of the machine, power management logic operable to calculate energy requirements for the machine's one or more batteries from the first input, the second input, the third input, and the memory, and one or more processors responsive to the power management logic.

Methods of predicting and managing the energy consumption of a machine, BEM, or other heavy equipment, may include calculating predicted energy consumption for the machine traversing one or more travel route segments using one or more special purpose processors programmed with the power management logic according to various embodiments of this disclosure. The power management logic receives data related to energy consumption. The one or more special purpose processors (e.g., microprocessors, programmable logic controllers (PLC's) etc.) may receive a first input comprising information about the environment of the machine, a second input comprising information about the operational parameters of the machine, a third input comprising a command input from the operator of the machine or autonomous control system, and a fourth input comprising machine information about the operational parameters of the machine. The method may also include the step of controlling the power output from one or more batteries of the machine to achieve desired speeds and performance of various tasks over particular travel route segments.

The step of calculating required power output from the batteries of the machine may include determining a route, segmenting the route into one or more travel route segments, calculating a predicted energy usage for each segment, totaling the segment energy usage, and assigning routes based on the available charge. The most energy efficient route for accomplishing a given task may take into account the current battery state-of-charge, and availability and location of a charging station. A display may be provided to an operator with an optimal speed, or commands may be provided to an autonomous system to maintain a certain speed determined to be an energy efficient speed for the machine to traverse the travel route segments. The required power output from the battery may be calculated continuously. For example, the required power output may be calculated at each point (e.g., every segment, or points within a segment) as the machine is driven. Thus, over an entire route, the most energy efficient speed at which to drive may be continuously calculated. This may be done by determining a destination, and then coming up with a route for that destination. If the destination is not known (e.g., has not been provided to the power management device or system), a predicted destination may be estimated, based on statistical destination logic (e.g., using map coordinates, and the historical operation of the machine). Energy efficient speeds for current and upcoming route segments can then be calculated based on the route. In some variations, the route is divided up into many distinct travel route segments based on terrain, areas of a job site where particular tasks are to be performed, intersections, etc. In some variations, the optimized speed for the machine is determined based on historical speeds for same or similar destinations. The route can be revised (e.g., continuously revised) during operation.

When a new route with one or more new travel route segments is received by the one or more controllers implementing power management logic according to various embodiments of this disclosure, the route may be divided into segments based, for example, on known grades, slopes, intersections, road surface conditions, etc. The power management logic may be programmed to compare each new segment to segments in a database having certain characteristics and determine matches. The logic may then determine what other machines have already traversed the database segments, and based on this historical information, determine battery or other power source energy usage for comparable segments and comparable machines. The logic may also be programmed to attempt to find a best match for a particular machine or machine, based on characteristics such as type, make, and model of machine, weight, and other characteristics to select a best prior estimation of battery or other power source energy usage for each historical travel route segment. In some cases, where same or similar machines have traversed the same match travel route segment, the logic may average or otherwise accumulate data to provide a best estimation of usage for that segment. In some cases an average weight for a particular type of machine can be used (loaded versus unloaded conditions). Additional parameters such as ambient temperature, time of day, weather, road conditions, and same or similar factors may be employed in the matching process. Additionally, the data associated with particular machine operators and their historical operational statistics for power efficiency, etc., for a particular machine may also be considered.

The power supplied and used by a machine such as a BEM can be optimized based on information inputs including: user demands, environmental conditions, the current or anticipated operational state of the machine, and the operational parameters for the machine. These parameters can be estimated, directly measured, or derived, and may be used to determine the driving route, types of tasks performed, order in which tasks are performed, repair or maintenance of travel route segments over which the machine will travel, etc., and therefore an estimated power requirement for the route. The estimated power requirement for a route and a historical power requirement from the same or similar machine traveling over the same or similar route may be used to determine the optimal power usage by the machine. The power required of a machine and the optimal power supplied and used by a machine may also be expressed in terms of the speed or velocity of the machine, tasks to be performed by the machine, and other energy usage parameters.

The power management devices and systems described herein may manage the power usage of the machine using inputs from four categories of information input: information from the external environment of the machine, information about the operational status of the machine, information from one or more command inputs, and operational parameters of the machine. Typically, at least one input from each of these sources of information is used to determine an optimal speed (or applied power) for the machine. Some of the information inputs for each of these categories are described below. In every case, the information may be directly measured (e.g., by sensors or other inputs), communicated from an external source, or it may be derived from other information inputs, or from stored data.

Information from the external environment of the machine may be used to determine the optimal power consumed by a machine. External environment information generally includes any information about the environment surrounding or acting on the machine. External information may be used to determine forces acting on the machine (e.g., drag, wind resistance, tire resistance, etc.), the location of the machine relative to the destination (e.g., position, direction, etc.), and the environment surrounding the machine (e.g., the proximity of other machines, equipment, or obstacles, road surface conditions, the presence of humans, safety signals at a job site, etc.). In some variations, the external information may be used to help describe the power available to the machine, particularly in solar powered machines (e.g., amount of light energy, time of day, position of the sun, etc.).

Examples of environmental information inputs include, but are not limited to: the current location of the machine, geographical information about the surrounding area, the elevation of the machine, upcoming elevations of the machine, the current slope/grade of road, the predicted slope/grade of the next travel route segments, other machines, obstacles, or humans in the proximity of the machine, the location of stoplights or other safety signals, a layout of a job site, the time of day, the weather around the machine, present wind direction and velocity, the predicted wind direction and velocity for upcoming route segments, current temperature, the predicted temperature for upcoming route segments, current air pressure, predicted air pressure for upcoming route segments, visibility, present road conditions, predicted road conditions for upcoming route segments, and the distance from other machines, obstacles, or humans. Some of the information inputs may be redundant, or may be derived from related information. For example, the machine location may be provided by a GPS device which may be either a separate device or a portion of the power management device that receives a GPS signal and locates the machine based on the received signal. Geographical and topographical information about the area surrounding the machine may be determined from the location information. For example, the location may be used to index an atlas of the surrounding area or job site. Some variations of the power management device may include a memory or database of information, including information about particular job sites, with periodic updates based on changes occurring at the job site. In some variations, the power management device communicates with one or more such databases to identify the location and surrounding road surface features (e.g., suggested speed limits, stop signs, traffic patterns, etc.).

The power management device may include or may be connected to sensors or other inputs to directly determine some of the information inputs. For example, the power management device may include a pre-set clock (e.g., for the current time and date), one or more optical sensors (e.g., to determine the intensity of sunlight, visibility, distance from nearby machines, etc.), and/or weather sensors (e.g., temperature, wind direction and velocity, air pressure, etc.). In some variations, the power management system receives some of this information by telemetry with off-board information sources such as databases and the like. For example, the power management system may communicate with a weather service, a map service, a traffic service, etc.

These examples of information about the external environment are only intended to illustrate the kinds of external information that may be used by the power management logic, devices, and systems described herein and are not intended to be limiting. Any appropriate information about the external environment may be provided to a power management device or used by the power management device.

Information about the operational status of the machine may be used to predict the power usage for the machine as a function of one or more travel route segments over which the machine will travel. Operational status information generally includes any information about the current operational status of the machine itself. Operational status information may be used to determine the current condition of the machine's batteries, other power source/s, and component parts (e.g., motor, powertrain, battery, tires, etc.), the current fuel supply, the manner in which the machine is traveling (e.g., velocity, acceleration, etc.), and the like.

Examples of environmental information inputs include, but are not limited to: the machine's current speed, the motor speed, the machine's current orientation, the RPM of the machine's motor, wheel rotations per minute, the battery state-of-charge, battery state-of-health, the voltage of the battery, the amp hours from the battery, the temperature of battery, the age of the battery, and the number of times the battery has charged and discharged (charge cycles), the tire pressure, the drag force due to rolling resistance of the machine, the weight of machine, the amount of air going to the engine, and the weight of operator.

As described above, some of the information inputs may be redundant, or may be derived from related information. Furthermore, the power management system may use any of the sensors, gauges and detectors already present in the machine as information inputs. For example, the velocity of the machine may be detected by a speedometer which may pass information on to the power management system. The power management device may also include additional sensors, inputs or detectors to determine or derive any information about the operational status of the machine. For example, the power management device or system may include one or more weight sensors (to determine the load in the machine, including the operator's weight).

The examples of operational status information inputs are only intended to illustrate the kinds of operational status information that may be used by the power management devices and systems described herein. Any appropriate information about the operational state of the machine may be provided to the power management device or used by the power management device.

Information from one or more command inputs may be used to determine the power demands on the machine. Command inputs generally include any instructions from the operator of the machine, from an autonomous controller, or from a semi-autonomous controller about the operation (or intended operation) of the machine. Command inputs may be directly input by the user, or they may be derived by the actions of the operator or the identity of the operator.

Examples of command inputs include, but are not limited to: the acceleration applied by an operator or commanded by an autonomous control system, the braking applied by an operator, the machine's known or predicted final destination, the machine's known or predicted interim destination, tasks to be performed by the machine, preferred speed, maximum and minimum range over which speed should be adjusted, and preferred route. As with all of the information inputs, some of the command inputs may be redundant, or may be derived from related information. For example, a route destination may be input by the operator, or it may be inferred from the driving behavior and/or identity of the operator. The identity of the operator may also be input by the operator, or it may be inferred. For example, the identity of the operator may be matched to the weight of the operator. Command inputs may include any of the operator's actions to control the machine. For example, command inputs may include steering, breaking, shifting, application of the accelerator, or application of other controls for performing designated tasks. The power management device may include sensors, inputs or detectors to monitor the manipulations of the operator. In some variations, the operator may directly input commands to the power management system or to other devices in the machine that communicate these commands to the power management system. For example, the operator may use an on-board navigational system to select a destination, and this destination may be communicated to the power management system. In some variations, the user may provide commands directly to the power management system. In some variations, the command inputs may be derived from other information, including the environmental information and the operational status information. For example, the destination (either a final or an intermediate destination) may be estimated based on the current location of the machine, the direction that the machine is traveling, the time of day and/or the operator of the machine.

Information inputs, including command inputs, may have default or pre-set values. For example, the power management device or system may have a preset or default maximum and minimum range of speeds for traveling part of the route (e.g., if the maximum and minimum range has not been explicitly input, the maximum and minimum range may be set to +/−4 mph). In some variations, the information inputs may include metadata describing one or more features of an information input. Metadata may include information about the information input. For example, metadata may indicate the last time a particular data input was updated, or may indicate that the data is a default setting, or the like.

These examples of command inputs are only intended to illustrate the kinds of command inputs that may be used by the power management devices and systems described herein. Any appropriate command input may be provided to the power management device or used by the power management device. Information from one or more operational parameters of the machine may be used to determine the optimal power to apply to the machine. Operational parameters generally include information about characteristics that are specific to the machine (e.g., characteristics of component parts of the machine, including the one or more batteries, the powertrain, the tires, etc.). Operational parameters of the machine may be stored and retrieved from a memory that is part of the power management device or system, or they may be retrieved from a remote information source.

Examples of operational parameters include, but are not limited to: rolling resistance parameters, drive train efficiency parameters, motor efficiency parameters, and battery model, state-of-charge and battery state-of-health parameters, battery charge and discharge cycles and relationships, type of battery. The operational parameters may be fixed (e.g., may not vary with operation of the machine), or they may be changed. In some variations, the operational parameters may comprise a database (e.g., a lookup table), so that the value of the operational parameter may depend upon another information input, and may be retrieved from the database by using one or more information inputs as a search key. In some variations, the operational parameter may comprise an equation or relationship that has other information inputs as variables.

Examples of operational parameters are provided below. In general, operational parameters may be determined experimentally (e.g., by testing) or may be provided by product manufacturers. In some variations, general (or generic) operation parameters may be used if more specific parameters are not available. For example, battery charge and discharge graphs (showing operational characteristics of the battery) can be obtained from battery manufacturers. Operational parameters for various types of batteries (e.g., Lithium polymer batteries, etc.) can include material characteristics, energy densities, power densities, thermal characteristics, cooling of the battery, cycle life, charge and discharge characteristics (e.g., voltage over time), and current flux over time. Motor efficiency data may also be obtainable from the manufacturer. A full model dynamometer testing may also be used to determine motor characteristics. Rolling resistance parameters may also be provided by the tire manufacturer, or may be measured. Same or similarly, a drivetrain efficiency model may be provided by the machine manufacturer, or may be measured from the power input vs. the power output for the entire drivetrain. In some variations, one or more electric motors may be directly connected to each wheel, thus eliminating losses due to drivetrain inefficiencies.

Examples of operational parameters are only intended to illustrate the kinds of operational parameters of the machine that may be used by the power management devices and systems described herein. Any appropriate operational parameter may be provided to the power management device or used by the power management device.

The route used by the power management device typically includes a starting position (e.g., the current position of the machine, which may be indicated by GPS), an ending position, as described above, and any intermediate positions between the initial and the final positions. In some variations, the route may be broken up into segments that may be used by a power management device to optimize the power needed to travel this segment. A segment may comprise any distance to be traveled, including the entire route, or small portions of the route. Different segments in the same route may be of different lengths.

The route may be segmented in any appropriate manner. For example, the route may be broken into segments based on terrain (e.g., the gradient or condition of a road), the locations where certain tasks are to be performed, condition of the road surfaces along the travel route, positions of intersections, stopping points, recharging locations, etc. In some variations, the route may be segmented based on a combination of such factors.

A route may be entirely segmented, or only partially segmented, and may be continuously or periodically re-segmented. For example, as the machine moves, the power management device may become aware of changing road conditions (e.g., development of soft underfoot conditions due to weather, packing of road surfaces due to increased traffic, etc.), or the user may change the route, necessitating re-segmenting. As used herein, "continuously" may mean repeated multiple times, including repeating regularly or periodically.

In some variations, the entire route (or the entire predicted route) may be divided up into N segments. The number (N) of segments may be fixed or may depend upon the route. The more segments that the route is split into, the more accurate a virtual energy consumption prediction model may be. However, more segments may also require more computing power. Thus, the number of segments N may be decided based on the tradeoff between computing power and accuracy.

The power required by the machine to travel along a route, or a segment of the route, may be estimated or calculated, and this calculation may be used to determine a calculated speed for the machine and tasks that may be performed by the machine when traveling along the travel route segments so that the power usage is optimized or minimized. Such calculations of power requirements at different speeds typically use information inputs from the machine, the user, and the environment over the route from the initial position to a destination (e.g., a final destination or an intermediate destination). Any appropriate information input may be used.

Simulation of the power requirement of the machine may estimate power requirements at different speeds. Thus, the speed(s) that the machine travels the route (or a segment of the route) can be optimized. For example, the simulation could determine the most energy efficient speed for the machine to travel over one or more segments by minimizing the power requirement for the machine while allowing the speed to vary within the range of acceptable speeds. Same or similarly, simulation of power requirement of the machine may include estimating power requirements for performing various tasks, such as grading earth, carrying a load, etc. As shown in FIGS. 1 and 2, the power management logic, power management system, and power management method according to various embodiments and implementations of this disclosure may include estimating the energy that will be consumed by one or more machines traveling over one or more travel route segments based on a historical amount of energy consumed by a machine with same or similar or identical physical and operational characteristics traveling over one or more travel route segments with same or similar or identical physical characteristics. A feedback loop may be provided such that a predicted or estimated energy usage for a particular travel route segment based on parameters that may include the machine location, machine systems efficiencies, site operational information (such as speed limits, delays caused by exterior conditions, etc.), battery characteristics such as state-of-charge, battery state-of-health, and number of charge cycles, and machine performance characteristics, may be compared with actual energy requirements, and the predicted energy usages may then be improved. The actual energy requirements may be retrieved from a database, which may be continually or periodically updated, including mapping one or more types of machines to one or more historical travel route segments and the actual historical amount of energy used by the machines in traversing the travel route segments. The historical information may include the machine location in each instance, machine systems efficiencies, battery characteristics such as state-of-charge, battery state-of-health, and number of charge cycles, and machine performance characteristics, including the actual power draw by each of the systems onboard the machine.

In some variations, the power management logic includes simulated energy requirement logic that determines the power requirement given the information inputs (e.g., information from the external environment of the machine, including the condition of the travel route segment or segments being traversed, the operational status of the machine, information from one or more command inputs, and operational parameters of the machine). The simulated energy requirement logic can calculate the required power for the machine by calculating different power requirements for all or a portion of the route (e.g., the first segment) when the speed of the machine is within the range of speeds acceptable for traveling this section of the route. Any appropriate method of calculating and/or optimizing this velocity may be used, including iteratively simulating different speeds within the target range.

The power management logic may refer to a record of historical route information. For example, the power management logic may be configured to access a memory or a data structure that holds information on routes or travel route segments that the machine, or a same or similar machine with same or similar physical and operational characteristics has previously traveled. The memory may comprise a database, a register, or the like. In some variations, a power management system communicates with a memory or other data structure that is located remotely. The record of historical route information may include the route information (e.g., starting location and any intermediate locations), as well as information about the actual or optimized velocities and/or applied power for the machine traveling the route. The record of historical route information may also include any informational from information inputs (described below). For example, the record of historical route information may include information about the time of day, weather conditions, road conditions, operator, etc. Multiple records for the same route (or segments of a route) may be included as part of the record of historical route information.

Historical data may be particularly useful when there is a large amount of such data available. Instead of trying to calculate the predicted power usage based on physics modeling, this method merely looks at all of the previous data to determine the power that was actually utilized to drive each segment at particular speeds, under certain conditions. The BEM or other machine may have been equipped with sensors and memory configured for recording speeds, gear ratios, tire pressures, and other operational parameters, and how much energy was actually used for traversing each travel route segment with particular physical characteristics. Therefore, to estimate how much energy would be required to drive each of a series of new travel route segments, the power may be estimated by taking an average of all of the previous times a same or similar machine traversed same or similar historical travel route segments to arrive at an estimated energy usage, rather than calculating the power from the physics calculations. In one variation, only the previous trips along the segment made under approximately same or similar conditions are considered (e.g., same or similar load, headwinds, road surface conditions, etc.).

The power management device may include control logic for controlling the operation of the power management device. Control logic may include logic for acquiring information inputs, communicating with different components of the power management system, estimating the destination of the machine from information inputs, segmenting the route into segments, simulating the energy requirements of the battery from information inputs, and controlling the entire power management device or system.

For example, the power management device or system may include polling logic for acquiring information inputs and may also coordinate writing of information from the power management device to a memory. In some variations, the polling logic polls sources of information data that are provided to the power management device. For example, the polling logic may poll data from sensors, inputs, memories, or any other source of information data. The polling logic may further coordinate storing of this data in a memory, such as a memory register or a memory device or database that may be accessed by the power management device or system. In some variations, the polling logic causes old data (e.g., greater than x weeks old) to be overwritten. The polling logic may also control how often the various information data sources are polled. For example, the polling logic may continuously poll data from external environmental sensors (e.g., detecting location, direction, elevation, slope, terrain, weather, etc.) and operational status detectors (e.g., detecting machine speed, gear ratio, cooling system, battery state-of-charge, battery state-of-health, number of battery charge cycles, etc.). The polling logic may also coordinate writing of route information and recording the decisions made at various locations along a series of travel route segments, including at intersections. In some variations, the polling logic also coordinates the writing of information derived from the information inputs to a memory. For example, the polling logic may coordinate recording the optimal speed or energy used to traverse a segment or other portion of a route.

Power management logic can coordinate different components of the power management system, including the logic components, user interfaces, informational data inputs, memory, processors, motor control mechanisms, and the like. Thus, the power management system may include power management logic to control the overall activity of the power management system. In general, the power management device comprises power management logic that receives information input about the external environment of the machine, the operational status of the machine, one or more command inputs from the operator, fully autonomous controller, or semi-autonomous controller, and one or more operational parameters of the machine. The power management device may also include additional components such as information inputs (e.g., sensors, detectors, relays, etc.), one or more processors (e.g., microprocessors), memories (e.g., databases, ROM, RAM, EPROM, etc.), communications devices (e.g., wireless connections), user interfaces (e.g., screens, control panels, etc.), and/or motor control mechanisms. In some variations, the power management device may be installed into the machine by the machine manufacturer. In other variations, the power management device may be retrofitted into a machine. In still further variations, the power management device may be remote to the machine. Any appropriate sensors, detectors or data inputs may be used with the power management devices, systems, and methods described herein. For example, sensors for detecting external environmental information may be used (e.g., optical, mechanical, electrical, or magnetic sensors). Sensors may be monitored (e.g., polled) in real-time, as described above. For example, polling logic may coordinate continuous or periodic polling of Global Positioning System (GPS) information (e.g., giving information on the machine's current location, current elevation, upcoming elevations, upcoming terrain, machine's destination, etc.), speedometer information (e.g., machine's current speed, motor speed), date and time information (e.g., the date and time may be used to determine personal driving habits and sun angle), gyroscope information (e.g., machine's current orientation, pose, current slope/grade of road), wheel rotations per minute, accelerator and brake pedal position (e.g., pressure applied and/or current angle of the petals), the angle of sun (e.g., sensors may detect latitude, longitude, time of day, date), weather (e.g., wind direction and velocity, rain, sun, snow, etc.), battery state (e.g., state-of-charge, battery state-of-health, charging cycles, voltage, amp hour meter, etc.), tire pressure (e.g., may be used to calculate the drag force due to rolling resistance), headway control information (e.g., the distance from another machine or obstacle, the weight of the machine (e.g., weight of cargo, operator), airflow (e.g., the amount of air going to the engine), gas flow sensor (e.g., the amount of gas going to engine of a hybrid or ICE car), weight of operator (e.g., may be used to identify the operator and linked to personal driving habits). Different detectors or sensors may be polled at different intervals, including continuously, or only occasionally. Polling may also depend upon the availability of a resource. For example, information may be available only when a telecommunications network (e.g., satellite, cellular, etc.) is available.

In some variations, a memory may be used. The memory may be read/write memory, or read only memory. The memory may include information, such as information on the operational parameters of the machine related to the make and model of the machine. As described above, operational parameters may include look up tables, charts, or the like. For example, a memory may include information about the type, make, and model of the machine, a rolling resistance model, a drive train efficiency model, a motor efficiency model, and/or a battery model (e.g., charge and discharge graphs for the battery). In some variations, these models are not part of a memory, but are algorithms or logic.

Any appropriate memory may be used, including ROM, RAM, removable memories (e.g., flash memory), erasable memories (e.g., EPROM), digital media (e.g., tape media, disk media, optical media), or the like. In some variations, the memory may comprise a database for holding any of the route information (including historical route information), about the segments traveled, the speeds traveled, energy usage measured or calculated for this route or segment, who the operator was, external environmental conditions and surface conditions while driving the route, operational status of the machine while driving the route, and command inputs while driving the route. The power management system may include more than one memory.

The power management system may also include one or more user interfaces. A user interface may allow input of user command information (e.g., selecting a destination, selecting a route, selecting a target speed or speeds, selecting a range of acceptable speeds, selecting particular tasks to be performed along a travel route segment, etc.). In some variations, a user interface may also provide output from the power management system that can be viewed by the user. For example, the user interface may provide visual or auditory output, or suggest target speeds that the user can match to optimize power supplied to the machine, and to ensure that the operator knows when the machine will need to be returned to a location for charging or replacement of one or more batteries. In some variations the user interface may provide status information to the user about the power management system. For example, the user interface may indicate that the power management system is engaged, what the destination (or predicted destination) is, what the optimal speed (or speeds) is, what inputs are missing or estimated, or the like. In some variations, the user interface may display any of the information inputs.

The power management system may also be used with a telemetry system. Thus, the power management system may communicate with one or more external components. For example, the power management system may store information in a remote memory. The power management system may also contribute to a database of information about route, road conditions, and the like, such as a database of historical route information and the mapping of amounts of energy used by particular types of machines traveling along particular travel route segments with certain physical characteristics. In some variations, the motor control system may remotely communicate with a processor, so that at least some of the control logic is applied remotely.

A manned machine may travel along a known path, based on one or more of an operator's knowledge of a desired path from one point at a work site to another point, physical markings along the desired path, instructions received in an operator's cabin of the machine via wired or wireless communications of current geographical positions and directional headings to follow along the desired path, a display such as a virtual reality display or augmented reality display in the operator's cabin showing a representation of the manned machine traveling along the desired path in real time, etc. A manned machine may perform some type of operation associated with an industry such as mining, construction, farming, freighting, or another industry. Although a manned machine may be designed to operate with a human operator, alternative implementations may include autonomous or semi-autonomous machines designed to operate without an operator. In any case, each of the machines may be, for example, an on or off-highway haul truck, or another type of equipment, which may haul a load material. Machines may include motor graders, excavators, dozers, dump trucks, water trucks, or another type of equipment, which may be used to repair or maintain travel route segments.

A worksite including travel route segments may be, for example, a mine site, a landfill, a quarry, a construction site, a logging site, a road worksite, or any other type of worksite. In an exemplary implementation, machines may travel between locations at an oil sands mining site, or other location and may encounter soft underfoot conditions. The roadways and travel route segments may at times be rendered unpredictable by for example, weather conditions, usage patterns, machine load losses, natural disasters, tectonic shifts, mud slides, rock slides, and/or other deteriorative events and/or processes. These roadways may include unpredictable portions, which may increase time and/or costs associated with traveling between locations. Additionally, the unpredictable portions may disable machines by, for example, causing machines to slip, get stuck, deplete their energy (e.g., fuel or electric charge), or crash. Some of the unpredictable portions of paths may include soft underfoot condition portions, iced portions, wet portions, or portions with oil or other slippery materials, which may cause machines to experience significant wheel slip and/or rolling resistance, or to lose traction with the ground surface. Each location along travel route segments with conditions that affect traction of one of machines may or may not affect a heading and/or location of the machine. For example, a soft underfoot condition may cause the machine to fishtail, irregularly accelerate (accelerate slower than expected), or irregularly decelerate (decelerate slower than expected). Alternatively or additionally, the soft underfoot or other road surface condition may cause one or more traction devices of the machine to rotate irregularly (faster or slower than expected), or result in the machine experiencing unacceptable or undesirable changes in pitch rate, yaw rate, and/or roll rate.

Soft underfoot conditions or other road surface conditions conducive to slippage of a work machine may be identified by an operator of a particular machine such as manned machine, or by sensors associated with an autonomous or semi-autonomous machine. With a manned machine, identification of surface conditions that may affect the trajectory and energy usage of the machine may be based on the operator's experiences when operating the same or same or similar machines due to various sensory inputs to the operator such as force feedback (generally referred to as haptic feedback) through various controls and/or an operator seat, visual feedback, auditory feedback, and proprioceptive feedback. Alternatively or in addition, surface conditions such as soft underfoot conditions may be identified without any operator input, such as by comparisons of values for various signals received from sensors to predetermined threshold values. Each machine may include a loss of traction response system configured to predict, identify, avoid, and/or minimize the effects of underfoot condition portions of a travel path that may affect the trajectory of the machine by changing ways in which the machine operates. An exemplary purpose of a system according to various embodiments of this disclosure may be to maximize the speed and productivity of an autonomous machine while minimizing energy usage and any risk of collision with a manned machine.

Variable factors such as machine characteristics, weather characteristics, and road and soil surface conditions may affect terrain surface coefficient of friction values along the travel route segments for the machine. As a result, a speed of a machine and the radius of curvature of a particular travel route segment traversed by the machine may result in a lateral acceleration of the machine equal to the square of machine speed ($V^2$) divided by the radius of curvature (R). The lateral acceleration of a machine as it travels along a curved path may exceed a lateral acceleration at which the machine loses traction with the surface and slides along a slide trajectory. Under these types of conditions, when the actual rolling resistance becomes indeterminate, the system may approximate rolling resistance through a comparison of energy usage for two same or similar machines traversing same or similar travel route segments while other energy usage contributing factors such as tire pressure, and gear ratio of the machine drive train, are approximately the same.

The system may include a machine location information determination module, which is configured to receive data from a series of sensors such as Global Positioning System (GPS) receivers, Inertial Reference Units (IRU), Inertial Measurement Units (IMU), Dead-Reckoning Navigation units, RADAR, LIDAR, and the like. Additionally, the system may include a terrain determination module configured for determining characteristics of the terrain over which the machines are traveling, such as pitch and grade. Real time data may also be provided by a soil conditions estimation module, such as a terrain surface coefficient of friction estimation module, which is configured to receive data from a sensing system, wherein the data is representative of various machine characteristics, weather characteristics, or road surface or soil conditions that may contribute to slip conditions and affect the behavior of the machine traveling along the travel route segments.

In one exemplary embodiment of this disclosure, the sensing system associated with the terrain surface coefficient of friction estimation module may be configured to generate signals indicative of characteristics of the machine that may affect whether the machine slips at any particular point in time or position as it travels along a travel route segment. These machine characteristics may include, for example, machine speed, machine pose, machine size, machine weight, the types and conditions of the machine tires, machine loads, and current gear ratios of a drive train for the machine. The sensing system may also be configured to generate signals indicative of weather characteristics at the time that may affect slippage of the machine, such as ambient temperature, humidity, rain, wind, ice, snow, etc. The sensing system may be still further configured to generate signals indicative of road surface and soil conditions, such as those discussed above, leading to soft underfoot conditions, and other road surface conditions contributing to slippage of the machine as it travels along a travel route segment.

Data on the geographic location of a machine may be provided in real time to a machine trajectory determination module. In various embodiments, a machine location information determination module may be included as part of an off-board central processing system, or as part of an on-board processing system, with sensors such as one or more GPS receivers mounted directly on the machine. A machine rolling resistance determination module included as part of the power management system according to embodiments of this disclosure may also be configured (programmed) to receive real time input that shows the position of the machine on a map of a work site, including the position of the machine relative to other job site characteristics such as hazards, fixed obstacles, and updated changes to terrain, as provided by a terrain determination module.

The power management system may also include a machine rolling resistance determination module, and any combination of processing modules configured to receive signals indicative of characteristics and conditions that may affect rolling resistance for the machine as it travels over various travel route segments. Sensors onboard a machine may include location sensors such as GPS, IMU, RADAR, LIDAR, and other sensors providing real time data on the positions of the machine. Additional sensors may provide signals indicative of the pitch and grade of the terrain along which the travel route segments are located, and signals indicative of characteristics of the machines, weather characteristics, and road surface conditions that may affect the rolling resistance and amount of energy consumed by the machine.

In one exemplary embodiment, the various sensors may be configured to output data in an analog format. In another embodiment, the sensors may be configured to output data in a digital format. For example, the same measurements of pitch, grade, machine characteristics, weather characteristics, or road surface conditions may be taken in discrete time increments that are not continuous in time or amplitude. In still another embodiment, the sensors may be configured to output data in either an analog or digital format depending on the sampling requirements of a machine rolling resistance determination module. The sensors can be configured to capture output data at split-second intervals to effectuate "real time" data capture. For example, in one embodiment, the sensors can be configured to generate thousands of data readings per second. It should be appreciated, however, that the number of data output readings taken by a sensor may be set to any value as long as the operational limits of the sensor and the data processing capabilities of the various modules are not exceeded.

In one embodiment of a power management system or method according to this disclosure, a comparison module may be configured for performing real time comparisons of travel route segments being presently traveled over by a machine and historical travel route segments with same or similar physical characteristics mapped to a same or similar machine and historical amount of energy consumption. The purpose of the comparisons performed by the comparison module may be to determine what other machines with same or similar physical and operational characteristics have traversed same or similar travel route segments in the past and the amount of energy consumed by those machines. The comparison module may be programmed to attempt a best match at a particular machine type, model, weight, and other physical and operational characteristics to select the best prior estimation of charge use for a particular travel route segment. In some cases, where same or similar machines have traversed the same match travel route segment, the comparison module may be configured to average or otherwise accumulate data to provide a best estimation of power usage for that segment. The comparison module may include a virtual system modeling engine configured to generate a large number of potential scenarios for the amounts of energy used by different types of machines traversing different travel route segments under a large number of different conditions. The modules may also be associated with calibration engines configured for checking the accuracy of virtual system estimations of energy usage versus actual energy usage, and feedback loops for improving estimations of energy consumption, calibration of sensors, and updates to computations where needed. The system may also include databases configured to store the large amount of data associated with many different travel route segments under continually changing conditions and many different types of machines with a variety of different operational characteristics. Additional engines or processing modules may also be included with or associated with the power management system, such as an operator behavior modeling engine associated with a particular manned machine, a simulation engine associated with an autonomous machine, and other machine learning or artificial intelligence engines or processing modules. A virtual system modeling engine included with one or more of the modules may be used to precisely model and mirror the actual energy consumption of a particular machine traversing a particular travel route segment, based on physics-based equations, historical data, and/or empirical data derived from monitoring the behavior of same or similar machines operating on the same or same or similar terrain under the same or same or similar conditions. Analytics engines associated with each of the modules can be configured to generate predicted data for the monitored systems and analyze differences between the predicted data and the real-time data received from the various sensors.

Various modules of the power management system according to some exemplary embodiments of this disclosure, such as a soil condition estimation module, a terrain surface coefficient of friction estimation module, or a rolling resistance estimation module, may include a machine learning engine. The machine learning engine may be configured to receive training data comprising historically or empirically derived values for input data representing one or more of physical or operational characteristics of a historical machine that are approximately the same as corresponding physical or operational characteristics of a presently operational machine, such as pose, size, weight, tire type, tire pressure, load, gear ratio, weather characteristics, and road conditions for the presently operational machine traveling along a new travel route segment with approximately the same pitch, grade, and other characteristics as the historical travel route segment. Physical or operational characteristics that are "approximately the same" or "same or similar" refers to a selection of characteristics affecting the behavior of a machine that have been shown historically, empirically, and/or through the implementation of physics-based equations to result in an amount of energy usage that falls within normally accepted tolerances of the amount of energy usage of another machine. The training data may also include a plurality of historically or empirically derived energy usage of the historical machine associated with the historically or empirically derived input data.

The machine learning engine may be configured to train a learning system using the training data to generate a plurality of projected amounts of energy usage for a particular type machine having particular physical and operational characteristics as it travels over a particular travel route segment based on real time values for the input data using a learning function including at least one learning parameter. Training of the learning system may include providing the training data as an input to the learning function, with the learning function being configured to use the at least one learning parameter to generate the plurality of projected amounts of energy usage based on the real time input data. The training may also include causing the learning function to generate the plurality of projected amounts of energy usage based on the real time input data, and comparing the projected amounts of energy usage based on the real time input data to the plurality of historically or empirically derived amounts of energy usage of a machine to determine differences between the projected or estimated amounts of energy usage and the historically or empirically derived amounts of energy usage. The training may still further include modifying the at least one learning parameter to decrease the differences responsive to the differences being greater than threshold differences. In various alternative implementations, the learning system may include at least one of a neural network, a support vector machine, or a Markov decision process engine.

The machine learning engine may be configured to implement pattern/sequence recognition into a real-time decision loop that, e.g., is enabled by machine learning. The types of machine learning implemented by the various engines of one or more of the modules according to this disclosure may include various approaches to learning and pattern recognition. The machine learning may include the implementation of associative memory, which allows storage, discovery, and retrieval of learned associations between extremely large numbers of attributes in real time. At a basic level, implementation of associative memory stores information about how attributes and their respective features occur together. In particular, in various implementations according to this disclosure, a machine learning engine may implement associative memory that stores information about attributes such as the amounts of energy usage of various machines and machines with different characteristics operating on different surfaces under different conditions, and respective features characterizing those attributes. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses of the various modules, associate the patterns with particular outcomes, contexts or responses, and determine, for example, the amounts of energy usage of a particular machine operating along a particular travel route segments with particular physical characteristics.

The machine learning algorithms incorporated into one or more of the modules according to this disclosure may also assist in uncovering potential combinations of factors and conditions that may lead to amounts of energy usage for a machine operating at a work site falling outside of an acceptable level of risk of depleting batteries on the machine before being able to return to a location for replacement of the batteries or performance of maintenance on the batteries. Machine learning algorithms and artificial intelligence may be particularly useful in processing the large amounts of data acquired over time from operating many different types of machines on many different terrains under many different conditions. The amount of information is so great that an "intelligent" system employing machine learning algorithms may be useful in recommending possible alterations to machine physical or operating characteristics under different ground surface conditions for the purpose of improving energy efficiency and productivity of machines such as BEMs operating at a remote work site. Through the application of the machine learning algorithms and virtual system modeling according to various embodiments of this disclosure, by observing simulations of various outcomes determined by different machine characteristics, different road repair or maintenance operations, and different machine operational parameters, and by comparing them to actual system responses, it may be possible to improve the simulation process, thereby allowing for continual improvements in productivity and energy efficiency.

In some embodiments, the machine learning engine may include a neural network. The neural network can include a plurality of layers each including one or more nodes, such as a first layer (e.g., an input layer), a second layer (e.g., an output layer), and one or more hidden layers. The neural network can include characteristics such as weights and biases associated with computations that can be performed between nodes of layers. The machine learning engine can be configured to train the neural network by providing the first input conditions to the first layer of the neural network. The neural network can generate a plurality of first outputs based on the first input conditions, such as by executing computations between nodes of the layers. The machine learning engine can receive the plurality of first outputs, and modify a characteristic of the neural network to reduce a difference between the plurality of first outputs, for example, slide trajectories determined from historical or empirical data, and a plurality of slide trajectories measured under real time conditions.

In some embodiments, the learning system may include a classification engine, such as a support vector machine (SVM). The SVM can be configured to generate a mapping of first input conditions to a first set of energy usage calculations for a machine. For example, the machine learning engine may be configured to train the SVM to generate one or more rules configured to classify training pairs (e.g., each first input condition and its corresponding effect on a resulting amount of energy usage). The classification of training pairs can enable the mapping of first input conditions to first predicted amounts of energy usage by classifying particular first predicted amounts of energy usage as corresponding to particular first input conditions. Once trained, the machine learning engine can generate predicted amounts of energy usage based on a second set of input conditions by applying the mapping or classification to the second set of input conditions.

In some embodiments, the machine learning engine may include a Markov decision process engine. The machine learning engine may be configured to train the Markov decision process engine to determine a policy based on the training data, the policy indicating, representing, or resembling how a particular machine would behave in response to various input conditions. The machine learning engine can provide the first input conditions to the Markov decision process engine as a set or plurality of states (e.g., a set or plurality of finite states). The machine learning engine can provide first predicted amounts of energy usage to the Markov decision process as a set or plurality of actions (e.g., a set or plurality of finite actions). The machine learning engine can execute the Markov decision process engine to determine the policy that best represents the relationship between the first input conditions and first amounts of energy usage. It will be appreciated that in various embodiments, the machine learning engine can include various other machine learning engines and algorithms, as well as combinations of machine learning engines and algorithms, that can be executed to determine a relationship between the plurality of first input conditions and the plurality of first predicted amounts of energy usage and thus train the machine learning engines.

Each of the modules discussed above may include a controller, which may comprise one or more processors and one or more memory devices. The various functions performed by each module are enabled and implemented by various combinations of hardware and software associated with the one or more processors and one or more memory devices, which result in special purpose structural distinctions to each module. In some embodiments, each module may also include a controller configured to communicate with a receiver to receive from an offboard system information on surface conditions, machine characteristics, weather predictions, and historical information relevant to a particular travel path currently being traversed by a particular autonomous machine.

In one exemplary embodiment, one or more modules may include a controller configured to group or classify data characterizing various machine operational parameters acquired empirically at a particular job site over a long period of time, by a variety of different machines, and under a large variety of different conditions. The data may be stored in one or more memory devices as a reference database, and may include values pertaining to actual energy usage, rolling resistance, wheel slip ratio, machine velocity, and machine pose (including pitch, roll, and yaw) under different job site surface conditions and at different locations calculated for various types of machines operating over different travel route segments at the job site. One or more processors of one or more modules may be configured and programmed in order to result in one or more special purpose processors that are configured to classify the data collected from each job site, with or without actual human operator input, and predict the existence of soft underfoot conditions or other surface conditions that affect the amounts of energy usage by machines such as battery electric powered machines (BEMs). In various exemplary embodiments, a controller may be configured and programmed to analyze real time data received from various sensors on a machine, utilize machine learning techniques in order to train a classifier using the data gathered by various machines operating at job sites, compare the analyzed data with predetermined threshold values for various parameters, identify any trends or patterns in the real time data, and generate appropriate command control signals to change ways in which the machine operates in a manner designed to maximize speed and productivity of the autonomous machine while minimizing energy usage.

In other exemplary embodiments of this disclosure, a controller onboard a machine such as a BEM may be programmed with logic for performing a method that includes monitoring the health of batteries used to power the machine and predicting the maintenance or replacement schedule for the batteries as a function of the segments of a travel route over which the machine is currently being operated. The method may include determining a location of the machine, determining a terrain on which the machine is operating, estimating a terrain surface coefficient of friction, and generating signals indicative of data representing one or more of speed of the machine, pose of the machine, size of the machine, weight of the machine, tire type and pressure on the machine, load on the machine, cooling system performance on the machine, gear ratio for the drive train of the machine, weather characteristics, and road conditions and characteristics for the machine operating at a job site, using a sensing system. The method may also include receiving historical information mapping the performance and energy consumption of the machine operating over one or more travel route segments to the one or more travel route segments. The historical performance information may include one or more of battery state-of-charge, battery state-of-health, and number of charge cycles for the one or more batteries supplying power to the machine with associated physical and operational characteristics as it was operated over one or more travel route segments having particular physical characteristics same or similar to physical characteristics of present travel route segments over which the machine is currently being operated. The method may still further include comparing the historical performance and energy consumption information for same or similar machines traveling on a same or similar travel route segment to the present performance and energy requirements while compensating for energy consumption contributing factors that are not common to both the historical performance and the present performance, and instruct an operator or autonomous control system to replace or perform maintenance on the batteries if the difference between present and historical performance exceeds a threshold level.

Machine command modules may be configured to send command control signals to various operational devices such as solenoids, pumps, valves, motors, and switches to effect changes in gear ratios, flow rates and flow directions for various operational fluids, voltage, current, and/or power outputs associated with various electrical power sources, brake controls, and/or steering controls. In some instances, the command control signals from one or more modules of a power management system according to various embodiments of this disclosure may cause a machine to change speed, acceleration, braking, or other operational parameters, recommend a change in travel route segments over which the machine will travel, or recommend repair or maintenance to one or more travel route segments over which the machine is traveling, as a function of a determined difference between a predicted amount of energy usage and an actual amount of energy usage exceeding a threshold value.

INDUSTRIAL APPLICABILITY

The disclosed embodiments of a system and method for estimating and predicting the amounts of energy that will be required by a BEM to complete certain tasks while traveling over predetermined travel route segments are applicable for all varieties of heavy equipment being operated at a work site. The disclosed systems and methods are applicable, for example, at job sites such as mining sites, where large haul trucks and other mining machines travel back and forth between locations where loaders are digging up minerals from the ground and loading the minerals into the haul trucks, and locations where the minerals are dumped from the haul trucks for further processing or transport to other locations. As more BEMs are employed in these endeavors, particularly at remote mining sites, the ability to accurately predict energy requirements for operation of the machines becomes especially important to ensure that the BEMs have sufficient energy left in their batteries to return to a location where their batteries can be replaced or have maintenance performed, such as charge balancing of the cells of the batteries, recharging, etc., which may be important in determining assignments for the different BEMs in a fleet of BEMs operating at a work site.

A system and method for monitoring the health of a BEM according to embodiments of this disclosure may also employ program logic, which may be recorded on a non-transient computer-readable medium for use in monitoring and managing the health of batteries used to power the BEM. The computer-readable medium may include computer-executable instructions for performing a method that may include monitoring the health of batteries used to power heavy equipment such as a BEM and predicting the maintenance or replacement schedule for the batteries as a function of the segments of a travel route over which the BEM is currently being operated.

In exemplary implementations of methods according to this disclosure, as shown in FIGS. 3-5, an operator or autonomous system may provide inputs regarding a particular travel route, including beginning and end locations, based on a task to be performed by a BEM. The method may further include receiving positional data from various sources, including maps, GPS devices, and from other machines operating at a work site. The travel route may be segmented either manually or automatically, based on an algorithm or virtual modeling of a particular work site. The algorithm or modeling may use information obtained from prior travel route segmentations, or from the results of modeling of the particular work site based on tasks to be performed, information specific to a fleet of BEMs operating at the work site, such as the types, models, and makes of the machines, payloads on the machines, physical and operational characteristics of the machines, and environmental data relating to terrain, weather, and other external data relating to a particular work site. Actual energy usage and other data collected by sensors on one or more BEMs, including data related to the number of charge cycles, state-of-charge, and state-of-health of the batteries that power the BEMs, payloads on the BEMs, and other physical and operational characteristics of the BEMs may be mapped to the particular travel route segments traversed by each BEM to create a historical database.

After having created the historical database, which may be continually or periodically updated as additional BEMs continue to traverse additional travel route segments, estimations of energy usage for a presently operational BEM traversing new travel route segments may be determined or predicted by first determining a best match or fit between the presently operational BEM traversing a new travel route segment and historical data from a similar BEM traversing a similar travel route segment. The method for matching a presently operational BEM traversing a new travel route segment to the historical information may include assignment of priorities or additional weighting to historical data for the same or similar machine, same or similar payload on the machine, and same or similar physical or operational characteristics, such as number of charge cycles, state-of-charge, or state-of-health of batteries powering the machine. For example, historical data for the same machine carrying the same payload may be given a higher priority or greater weighting, with other factors such as the types and pressure of tires on the machine being given a lower priority or weighting. In some implementations, only historical travel route segments with preferred characteristics, such as similar slope and similar soil conditions, may be used in matching the new travel route segment to a historical travel route segment. After having matched the presently operational machine traversing a new travel route segment to data relating to a historical machine traversing a historical travel route segment, a prediction of energy usage may be made. A comparison of data relating to battery operation and energy usage for the presently operational BEM with the historical data may be made to determine whether any differences exceed predetermined threshold values, indicative of a problem with the performance of the batteries. Additionally, predictions of energy usage for a presently operational BEM based on historical data may be enhanced as additional data is received and stored. For example, data may be indicative of a correlation between a change in payload on a particular type of machine with similar physical and operational characteristics to another machine with a different payload and a change in the amount of energy usage. Correlations such as this may be factored into the predictions of energy usage for a presently operational machine traversing a new travel route segment. Identification of aberrations or deviations from expected energy usage outside of acceptable thresholds, in some cases after analysis and elimination of outlying data, may also result in an output of a fault alarm, alert, or other report to an operator, possibly indicating a need for maintenance, automatically scheduling maintenance, or directing a manned or autonomous machine to a particular location for maintenance.

The method may include determining what travel route segment the BEM is currently operating along, determining a terrain on which the BEM is operating, estimating soil conditions, including a terrain surface coefficient of friction, and generating signals indicative of data representing one or more of speed of the BEM, pose of the BEM, size of the BEM, weight of the BEM, tire type on the BEM, payload on the BEM, cooling system performance on the BEM, gear ratio for the drive train of the BEM, weather characteristics, and road conditions and characteristics for the BEM operating at a job site, using a sensing system. The method may also include receiving historical information mapping the performance of the BEM operating over one or more travel route segments at one or more job sites. The historical performance information may include one or more of battery state-of-charge, battery state-of-health, and number of charge cycles for the one or more batteries supplying power to the BEM with associated physical and operational characteristics as it was operated over one or more travel route segments having particular physical characteristics same or similar to physical characteristics of present travel route segments over which the BEM is currently being operated.

The method may still further include comparing the historical performance and energy consumption information for same or similar BEMs traveling on a same or similar travel route segment to the present performance and energy requirements while compensating for energy consumption contributing factors that are not common to both the historical performance and the present performance. The method may include instructing an operator or autonomous control system to replace or perform maintenance on the batteries based on an indication or a trend, such as when the difference between present and historical performance exceeds a threshold level, or a rate of change of performance for a battery exceeds an acceptable level that is normally expected for an aging battery and/or machine. Reports may be generated and provided to an operator or an autonomous system, providing predictions of battery life remaining before the battery will require servicing or replacement.

A method according to one or more implementations of this disclosure includes predicting the energy requirement for a presently operational machine traveling over one or more new travel route segments. The method may include comparing each of the new travel route segments to historical travel route segments in a database of historical travel route segments having particular characteristics and being mapped to historical machines with associated physical and operational characteristics and actual historical energy consumption for each historical machine traveling along each historical travel route segment. The method may further include matching the presently operational machine and the one or more new travel route segments to a historical machine in the database with same or similar physical and operational characteristics to the presently operational machine traveling along a historical travel route segment in the database with same or similar characteristics to the one or more new travel route segments and determine the predicted energy requirement for the presently operational machine based on the actual historical energy consumption for the matched historical machine. The method may include tallying the total energy usage for all segments for a given route, and providing an indicator as to whether a selected route or task can be completed on a current state-of-charge for a battery on the machine. Alternative routes or tasks may be available with predicted charge requirements for each route that may be used for route selection or fleet assignments. Alternatively, the method may include recharging— or directing a machine to be charged to a certain level to enable completion of an anticipate route. The method may still further include changing one or more of the new travel route segments for the presently operational machine, tasks to be performed by the presently operational machine, or repair or maintenance tasks to be performed on one or more of the new travel route segments for the presently operational machine based on a comparison of the predicted energy consumption for the presently operational machine with the actual historical energy consumption for the matched historical machine traveling over the historical travel route segment and based on a difference between the predicted energy requirement for the presently operational machine and the actual historical energy consumption for the matched historical machine traveling over the historical travel route segment exceeding a predetermined threshold value.

It will be apparent to those skilled in the art that various modifications and variations can be made to the system of the present disclosure without departing from the scope of the disclosure. Other embodiments will be apparent to those skilled in the art from consideration of the specification and practice of the system and methods disclosed herein. It is intended that the specification and examples be considered as exemplary only, with a true scope of the disclosure being indicated by the following claims and their equivalent.

What is claimed is:

1. A control system programmed for monitoring the health of batteries used to power a particular battery electric machine (BEM) as a function of one or more travel route segments the particular BEM is traversing, the control system being programmed to:
   generate signals indicative of data representing present performance and energy requirements for the particular BEM including one or more of the present battery state-of-charge, battery state-of-health, and number of charge cycles for each of the batteries used to power the particular BEM, present physical and operational characteristics for the particular BEM, and present physical characteristics of each of the travel route segments traversed by the particular BEM, using a sensing system;
   receive, from a database, historical information mapping performance and energy consumption of one or more BEMs traversing one or more travel route segments, the historical performance information including one or more of battery state-of-charge, power usage, battery state-of-health, and number of charge cycles for the one or more batteries supplying power to the one or more BEMs with associated physical and operational characteristics as the one or more BEMs traverse one or more travel route segments with associated physical characteristics;
   compare the historical performance and energy consumption information for a same or similar BEM traversing a same or similar travel route segment to the present performance and energy requirements while compensating for energy consumption contributing factors that are not common to both the historical performance and the present performance, and instruct an operator or autonomous control system to replace or perform maintenance on the batteries if the difference between present and historical performance exceeds a threshold level;
   compare each new travel route segment to be traversed by the particular BEM with historical travel route segments stored in the database and having the associated physical characteristics to determine matches;
   determine which of the plurality of BEMs with associated physical and operational characteristics have traversed the matching historical travel route segments; and
   determine the predicted energy requirements for the particular BEM to traverse the new travel route segment based on a comparison with the actual energy consumption of a comparable one of the plurality of BEMs traversing a matching historical travel route segment;
   wherein the control system includes a machine learning engine configured to:
     receive training data comprising historically or empirically derived values representing one or more of physical or operational characteristics of a presently operational BEM that are approximately the same as corresponding physical or operational characteristics of a historical BEM stored in the database, wherein the physical or operational characteristics of the historical BEM include one or more of machine type, model, make, or configuration, payload, tire type, tire pressure, gear ratio, and cooling system efficiency, and actual energy consumption when traversing a historical travel route segment;

receive training data comprising historically or empirically derived values representing one or more of weather characteristics, and physical characteristics associated with one or more new travel route segments that are approximately the same as corresponding weather characteristics and physical characteristics associated with one or more historical travel route segments;

train a learning system using the training data to generate a plurality of projected amounts of energy to be used by the presently operational BEM traversing one or more of the new travel route segments based on the historically or empirically derived values using a learning function including at least one learning parameter, wherein training the learning system includes:

providing the training data as an input to the learning function, the learning function being configured to use the at least one learning parameter to generate the plurality of projected amounts of energy based on the input data;

causing the learning function to generate the plurality of projected amounts of energy based on the input data;

comparing the projected amounts of energy based on the input data to the plurality of historically or empirically derived amounts of energy used by the historical BEM traversing one or more historical travel route segments to determine differences between the projected amounts of energy and the historical or empirically derived actual amounts of energy; and modifying the at least one learning parameter to decrease the differences responsive to the differences being greater than threshold differences.

2. The control system according to claim 1, wherein the associated physical and operational characteristics of each BEM include one or more of the make, model, or configuration of the BEM, the payload of the BEM, the speed at which the BEM is traversing a particular travel route segment, the tire type and pressure of one or more tires for the BEM, and a rolling resistance encountered by the BEM while traversing the particular travel route segment.

3. The control system according to claim 1, wherein the control system is further programmed to:

receive data on one or more of a pitch and a grade of one or more travel route segments and data on soil conditions of the one or more travel route segments; and determine a rolling resistance of the particular BEM at each of predetermined intervals of time corresponding to each of successive positions of the BEM along each of the one or more travel route segments based on measured actual energy consumption at each of the successive positions along each of the one or more travel route segments.

4. The control system according to claim 1, wherein the control system is further programmed to determine whether the particular BEM will have sufficient energy to complete assigned tasks while traversing the one or more travel route segments and return to a location for replacement of a battery or performance of maintenance on a battery.

5. The control system according to claim 1, wherein the control system is further programmed to divide a path to be traversed by the particular BEM into a plurality of the one or more travel route segments based on parameters that include one or more of known grades and other physical characteristics of the terrain along which the path is defined, intersections along the path, known obstacles along the path, safety signals such as stop lights along the path, surface conditions along the one or more travel route segments, and locations along the path where the BEM will perform particular tasks.

6. The control system according to claim 1, wherein the learning system includes at least one of a neural network, a support vector machine, or a Markov decision process engine.

7. The control system according to claim 1, wherein the control system is further configured to divide a path to be traversed by the particular BEM into a plurality of the one or more travel route segments based on parameters that include one or more of known grades and other physical characteristics of the terrain along which the path is defined, intersections along the path, known obstacles along the path, safety signals such as stop lights along the path, surface conditions along the one or more travel route segments, and locations along the path where the BEM will perform particular tasks.

8. A method of monitoring the health of batteries used to power a battery electric machine (BEM) and predicting the maintenance or replacement schedule for the batteries as a function of one or more travel route segments the BEM is traversing, the method comprising:

generating signals indicative of data representing present performance and energy requirements for the BEM including one or more of the present battery state-of-charge, battery state-of-health, and number of charge cycles for each of the batteries used to power the BEM, present physical and operational characteristics for the BEM, and present physical characteristics of each of the travel route segments traversed by the BEM, using a sensing system;

receiving, from a database, historical information mapping performance and energy consumption of one or more BEMs traversing one or more travel route segments, the historical performance information including one or more of battery state-of-charge, power usage, battery state-of-health, and number of charge cycles for the one or more batteries supplying power to the one or more BEMs with associated physical and operational characteristics as the one or more BEMs traverse one or more travel route segments with associated physical characteristics;

comparing the historical performance and energy consumption information for a same or similar BEM traversing a same or similar travel route segment to the present performance and energy requirements while compensating for energy consumption contributing factors that are not common to both the historical performance and the present performance;

instructing an operator or autonomous control system to replace or perform maintenance on the batteries if the difference between present and historical performance exceeds a threshold level;

comparing each new travel route segment to be traversed by the machine with historical travel route segments stored in the database and having the associated physical characteristics to determine matches;

determining which of the machines with associated physical and operational characteristics have traversed the matching historical travel route segments; and determining the predicted energy requirements for the machine to traverse the new travel route segment based on a comparison with the actual energy consumption of a comparable machine traversing a matching historical travel route segment;
receiving training data comprising historically or empirically derived values representing one or more of physical or operational characteristics of a presently operational BEM that are approximately the same as corresponding physical or operational characteristics of a historical BEM stored in the database, wherein the physical or operational characteristics of the historical BEM include one or more of machine type, model, make, or configuration, payload, tire type, tire pressure, gear ratio, and cooling system efficiency, and actual energy consumption when traversing a historical travel route segment;
receiving training data comprising historically or empirically derived values representing one or more of weather characteristics, and physical characteristics associated with one or more new travel route segments that are approximately the same as corresponding weather characteristics and physical characteristics associated with one or more historical travel route segments;
training a learning system using the training data to generate a plurality of projected amounts of energy to be used by the presently operational BEM traversing one or more of the new travel route segments based on the historically or empirically derived values using a learning function including at least one learning parameter, wherein training the learning system includes:
providing the training data as an input to the learning function, the learning function being configured to use the at least one learning parameter to generate the plurality of projected amounts of energy based on the input data;
causing the learning function to generate the plurality of projected amounts of energy based on the input data;
comparing the projected amounts of energy based on the input data to the plurality of historically or empirically derived amounts of energy used by the historical BEM traversing one or more historical travel route segments to determine differences between the projected amounts of energy and the historical or empirically derived actual amounts of energy; and
modifying the at least one learning parameter to decrease the differences responsive to the differences being greater than threshold differences.

9. The method according to claim 8, wherein the associated physical and operational characteristics of the machine include one or more of the make, model, or configuration of the BEM, the payload of the BEM, the speed at which the BEM is traversing a particular travel route segment, the tire type and pressure of one or more tires for the BEM, and the rolling resistance encountered by the BEM while traversing the particular travel route segment.

10. The method according to claim 8, further including:
receiving data on one or more of a pitch and a grade of one or more travel route segments and data on soil conditions along the one or more travel route segments; and
determining a rolling resistance of the presently operational machine at each of predetermined intervals of time corresponding to each of successive positions of the machine along each of the one or more travel route segments based on measured actual energy consumption at each of the successive positions along each of the one or more travel route segments.

11. The method according to claim 8, wherein the method further includes determining whether the presently operational machine will have sufficient energy to complete assigned tasks while traversing the path including the one or more travel route segments and return to a location for replacement of a battery or performance of maintenance on a battery.

12. The method according to claim 8, wherein the method further includes dividing the path to be traversed by the presently operational machine into a plurality of the one or more travel route segments based on parameters that include one or more of known grades and other physical characteristics of the terrain along which the path is defined, intersections along the path, known obstacles along the path, safety signals such as stop lights along the path, surface conditions along the one or more travel route segments, and locations along the path where the machine will perform particular tasks.

13. The method according to claim 10, including the use of at least one of a neural network, a support vector machine, or a Markov decision process engine.

14. The method according to claim 10, further including dividing the path to be traversed by the machine into a plurality of one or more travel route segments based on parameters that include one or more of known grades and other physical characteristics of the terrain along which the path is defined, intersections along the path, known obstacles along the path, safety signals such as stop lights along the path, surface conditions along the one or more travel route segments, and locations along the path where the machine will perform particular tasks.

15. A computer-readable medium for use in managing the health of batteries used to power heavy equipment, the computer-readable medium including computer-executable instructions for performing a method including:
generating signals indicative of data representing present performance and energy requirements for the heavy equipment including one or more of the present battery state-of-charge, battery state-of-health, and number of charge cycles for each of the batteries used to power the heavy equipment, present physical and operational characteristics for the heavy equipment, and present physical characteristics of each of the travel route segments traversed by the heavy equipment, using a sensing system;
receiving, from a database, historical information mapping performance and energy consumption of one or more of the heavy equipment traversing one or more travel route segments, the historical performance information including one or more of battery state-of-charge, power usage, battery state-of-health, and number of charge cycles for the one or more batteries supplying power to the one or more of the heavy equipment with associated physical and operational characteristics as the one or more of the heavy equipment traverse one or more travel route segments with associated physical characteristics;
comparing the historical performance and energy consumption information for a same or similar heavy equipment traversing a same or similar travel route segment to the present performance and energy requirements while compensating for energy consumption contributing factors that are not common to both the historical performance and the present performance;

instructing an operator or autonomous control system to replace or perform maintenance on the batteries if the difference between present and historical performance exceeds a threshold level;

comparing each new travel route segment to be traversed by the heavy equipment with historical travel route segments stored in the database and having the associated physical characteristics to determine matches;

determining which of the heavy equipment with associated physical and operational characteristics have traversed the matching historical travel route segments; and determining the predicted energy requirements for the heavy equipment to traverse the new travel route segment based on a comparison with the actual energy consumption of a comparable heavy equipment traversing a matching historical travel route segment;

receiving training data comprising historically or empirically derived values representing one or more of physical or operational characteristics of a presently operational heavy equipment that are approximately the same as corresponding physical or operational characteristics of a historical heavy equipment stored in the database, wherein the physical or operational characteristics of the historical heavy equipment include one or more of machine type, model, make, or configuration, payload, tire type, tire pressure, gear ratio, and cooling system efficiency, and actual energy consumption when traversing a historical travel route segment;

receiving training data comprising historically or empirically derived values representing one or more of weather characteristics, and physical characteristics associated with one or more new travel route segments that are approximately the same as corresponding weather characteristics and physical characteristics associated with one or more historical travel route segments;

training a learning system using the training data to generate a plurality of projected amounts of energy to be used by the presently operational heavy equipment traversing one or more of the new travel route segments based on the historically or empirically derived values using a learning function including at least one learning parameter, wherein training the learning system includes:

providing the training data as an input to the learning function, the learning function being configured to use the at least one learning parameter to generate the plurality of projected amounts of energy based on the input data;

causing the learning function to generate the plurality of projected amounts of energy based on the input data;

comparing the projected amounts of energy based on the input data to the plurality of historically or empirically derived amounts of energy used by the historical heavy equipment traversing one or more historical travel route segments to determine differences between the projected amounts of energy and the historical or empirically derived actual amounts of energy; and modifying the at least one learning parameter to decrease the differences responsive to the differences being greater than threshold differences.

\* \* \* \* \*